United States Patent
Ludwig

(10) Patent No.: US 9,442,652 B2
(45) Date of Patent: Sep. 13, 2016

(54) GENERAL USER INTERFACE GESTURE LEXICON AND GRAMMAR FRAMEWORKS FOR MULTI-TOUCH, HIGH DIMENSIONAL TOUCH PAD (HDTP), FREE-SPACE CAMERA, AND OTHER USER INTERFACES

(75) Inventor: Lester F. Ludwig, San Antonio, TX (US)

(73) Assignee: Lester F. Ludwig, San Antonio, TX (US)

( * ) Notice: Subject to any disclaimer, the term of this patent is extended or adjusted under 35 U.S.C. 154(b) by 1129 days.

(21) Appl. No.: 13/414,705

(22) Filed: Mar. 7, 2012

(65) Prior Publication Data
US 2012/0317521 A1 Dec. 13, 2012

Related U.S. Application Data

(60) Provisional application No. 61/449,923, filed on Mar. 7, 2011, provisional application No. 61/482,606, filed on May 4, 2011.

(51) Int. Cl.
G06F 3/033 (2013.01)
G06F 3/0488 (2013.01)

(52) U.S. Cl.
CPC .................. G06F 3/04883 (2013.01)

(58) Field of Classification Search
CPC ...... G06F 3/011; G06F 3/017; G06F 3/0354; G06F 3/041; G06F 3/0488; G06F 2203/04808
See application file for complete search history.

(56) References Cited

U.S. PATENT DOCUMENTS

| 4,748,676 A | 5/1988 | Miyagawa |
| 4,899,137 A | 2/1990 | Behrens et al. |
| 5,237,647 A | 8/1993 | Roberts et al. |
| 5,270,711 A | 12/1993 | Knapp |

(Continued)

FOREIGN PATENT DOCUMENTS

EP 0 574 213 B1 12/1993

OTHER PUBLICATIONS

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

(Continued)

*Primary Examiner* — Jeffrey A Gaffin
*Assistant Examiner* — Ayesha Huertas Torres
(74) *Attorney, Agent, or Firm* — Procopio, Cory, Hargreaves & Savitch LLP

(57) ABSTRACT

A method for a multi-touch gesture-based user interface wherein a plurality of gestemes are defined as functions of abstract space and time and further being primitive gesture segments that can be concatenated over time and space to construct gestures. Various distinct subset of the gestemes can be concatenated in space and time to construct a distinct gestures. Real-time multi-touch gesture-based information provided by user interface is processed to at least a recognized sequence of specific gestemes and that the sequence of gestemes that the user's execution a gesture has been completed. The specific gesture rendered by the user is recognized according to the sequence of gestemes. Many additional features are then provided from this foundation, including gesture grammars, structured-meaning gesture-lexicon, context, and the use of gesture prosody.

10 Claims, 27 Drawing Sheets

(56) References Cited

U.S. PATENT DOCUMENTS

| | | |
|---|---|---|
| 5,292,999 A | 3/1994 | Tumura |
| 5,341,133 A | 8/1994 | Savoy |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubuchi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,763,806 A | 6/1998 | Willis |
| 5,786,540 A | 7/1998 | Westlund |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1 | 10/2007 | Ludwig |
| 2008/0010616 A1 | 1/2008 | Algreatly |
| 2008/0036743 A1* | 2/2008 | Westerman ............ G06F 3/038 345/173 |
| 2008/0143690 A1 | 6/2008 | Jang |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0056846 A1 | 3/2012 | Zaliva |
| 2012/0108323 A1 | 5/2012 | Kelly et al. |
| 2012/0192119 A1 | 7/2012 | Zaliva |
| 2012/0194461 A1 | 8/2012 | Lim |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |
| 2012/0317521 A1 | 12/2012 | Ludwig |
| 2013/0009896 A1 | 1/2013 | Zaliva |
| 2013/0038554 A1 | 2/2013 | West |

OTHER PUBLICATIONS

Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.

Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.

(56) References Cited

OTHER PUBLICATIONS

VeriFinger Information, [online] [retrieved on Jun. 11, 2013] URL: http://www.fingerprint-it.com/_sol_verifinger.html, 2 pgs.
Prabhakar S., et al., Learning fingerprint minutiae location and type, Pattern Recognition 2003, 36, [online] URL:http://www.cse.msu.edu/biometrics/Publications/Fingerprint/PrabhakarJainPankanti_MinaLocType_PR03.pdf, pp. 1847-1857.
Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.
Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.
Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.
Image moment, Jul. 12, 2010, 3 pgs, [online] [retrieved on Jun. 13, 2013] URL: http://en.wikipedia.org/wiki/Image_moment.
Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.
Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.
Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.
Bishop, C.M., Pattern Recognition and Machine Learning, Springer New York, 2006, pp. 561-593.
Euler Angles, 2011, [online] [retrieved on Jun. 30, 2011] URL: http://en.wikipedia.org/w/index.php?title=Euler_angles&oldid=436460926, 8 pgs.
Electronic Statistics Textbook, StatSoft, Inc., 2011, [online] [retrieved on Jul. 1, 2011] URL: http://www.statsoft.com/textbook, 1 pg.
Central Moment, Dec. 16, 2009, [online] [retrieved on Oct. 26, 2010] URL: http://en.wikipedia.org/w/index.php?title=Central_moment&oldid=332048374.
Local regression, Nov. 16, 2010, [online] [retrieved on Jun. 28, 2011] URL: http://en.wikipedia.org/w/index.php?title=Local_regression&oldid=416762287.
USPTO Notice of Allowance dated Jun. 6, 2013 issued in U.S. Appl. No. 13/846,830, filed Mar. 18, 2013.
Hernandez-Leon, R., et al., Classifying using Specific Rules with High Confidence, 9th Mexican International Conference on Artificial Intelligence, IEEE, Nov. 2010, pp. 75-80.
Fang, Y., et al., Dynamics of a Winner-Take-All Neural Network, Neural Networks, 9(7), Oct. 1996, pp. 1141-1154.
Moog, R.A., The Human Finger-A Versatile Electronic Music Instrument Component, Audio Engineering Society Preprint, 1977, New York, NY, 4 pgs.
Johnson, C., Image sensor tracks moving objects in hardware, Electronic Engineering Times, Apr. 5, 1999, 1 pg.
Kaoss pad dynamic effect/controller, Korg Proview Users' magazine Summer 1999, 2 pgs.
Leiberman, D., Touch screens extend grasp Into consumer realm, Electronic Engineering Times, Feb. 8, 1999.
Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.
Pennywitt, K., Robotic Tactile Sensing, Byte, Jan. 1986, 14 pgs.
Review of KORG X-230 Drum (later called Wave Drum), Electronic Musician, Apr. 1994, 1 pg.
Rich, R., Buchla Lightning MIDI Controller, Electronic Musician, Oct. 1991, 5 pgs.
Rich, R., Buchla Thunder, Electronic Musician, Aug. 1990, 4 pgs.
Dario P., et al., Tactile sensors and the gripping challenge, IEEE Spectrum, vol. 5, No. 22, Aug. 1985, pp. 46-52.
Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Haken, L., An Indiscrete Music Keyboard, Computer Music Journal, Spring 1998, pp. 30-48.
USPTO Notice of Allowance dated May 8, 2013 issued in U.S. Appl. No. 12/541,948, filed Aug. 15, 2009.
Buxton, W. A. S., Two-Handed Document Navigation, Xerox Disclosure Journal, 19(2), Mar./Apr. 1994 [online] [retreived on May 28, 2013] URL: http://www.billbuxton.com/2Hnavigation.html, pp. 103-108.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806, filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.
Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.
Roberts Cross, [online] [retrieved on May 12, 2013] URL: http://en.wikipedia.org/wiki/Roberts_Cross, Jul. 20, 2010, visited Feb. 28, 2011, 3 pgs.
Sobel Operator, [online] [retrieved on May 12, 2013] URL: http://en.wikipedia.org/wiki/Sobel_operator, Mar. 12, 2010, visited Feb. 28, 2011, 5 pgs.
Prewitt, [online] [retrieved on May 12, 2013] URL: http://en.wikipedia.org/wiki/Prewitt, Mar. 15, 2010, visited Feb. 28, 2011, 2 pgs.
Coefficient of variation, [online] [retrieved on May 12, 2013] URL: http://en.wikipedia.org/wiki/Coefficient_of_variation, Feb. 15, 2010, visited Feb. 28, 2011, 2 pgs.
Canny edge detector, [online] [retrieved on May 12, 2013] http://en.wikipedia.org/wiki/Canny_edge_detector, Mar. 5, 2010, 4 pgs.

(56) References Cited

OTHER PUBLICATIONS

Polynomial regression, [online] [retrieved on May 12, 2013] URL: http://en.wikipedia.org/wiki/Polynomial_regression, Jul. 24, 2010, 4 pgs.

Pilu, M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL:https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en.

Osian, M., et al., Fitting Superellipses to Incomplete Contours, IEEE Computer Society Conference on Computer Vision and Pattern Recognition Workshops (CVPRW '04), Jun. 2004, 8 pgs.

Hough transform, [online] [retrieved on Feb. 13, 2010] URL: http://en.wikipedia.org/wiki/Hough_transform, Feb. 13, 2010, 7 pgs.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors, Sensor Products LLC, Oct. 26, 2006, [online] [retrieved on Aug. 6, 2013] URL: http://www.sensorprod.com, 2 pgs.

Pressure Profile Systems, Jan. 29, 2011, [online] [retrieved on Jan. 29, 2011] URL: http://www.pressureprofile.com, 1 pg.

Xsensor Technology Corporation, Feb. 7, 2011, [online] [retrieved on May 12, 2013] URL: http://www.xsensor.com, 1 pg.

Balda AG, Feb. 26, 2011, [online] [retrieved on May 12, 2013] URL: http://www.balda.de, 1 pg.

Cypress Semiconductor, Feb. 28, 2011, [online] [retrieved on May 12, 2013] URL: http://www.cypress.com, 1 pg.

Synaptics, Jan. 28, 2011, [online] [retrieved on May 12, 2013] URL: http://www.synaptics.com, 1 pg.

Venolia, D., et al., T-Cube: A Fast, Self-Disclosing Pen-Based Alphabet, CHIi '94 Proceedings of the SIGCHI Conference on Human Factors in Computing Systems, Apr. 24-28, 1994, pp. 265-270.

Davis, R. C., et al., NotePals: Lightweight Note Taking by the Group, for the Group, University of California, Berkeley, Computer Science Division, 1998, 8 pgs.

Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

\* cited by examiner

\* Adapted from M. Eden, "On the Formalization of Handwriting" in *Structure of Language and its Mathematical Aspects*, American Mathematical Society, 1961.

* Adapted from M. Eden, "On the Formalization of Handwriting" in *Structure of Language and its Mathematical Aspects*, American Mathematical Society, 1961.

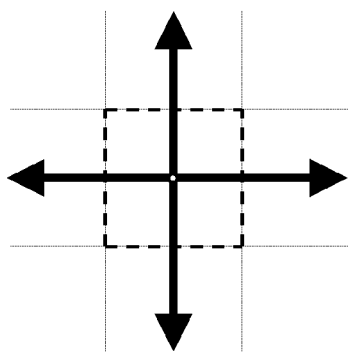
FIG. 15b
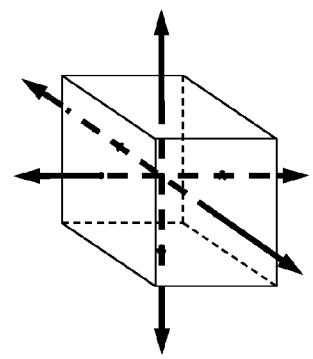
FIG. 16b
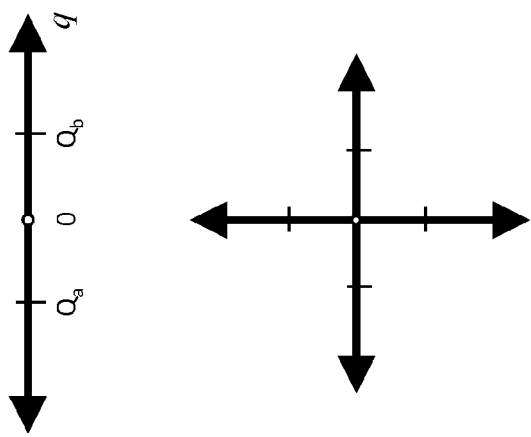
FIG. 14
FIG. 15a
FIG. 16a
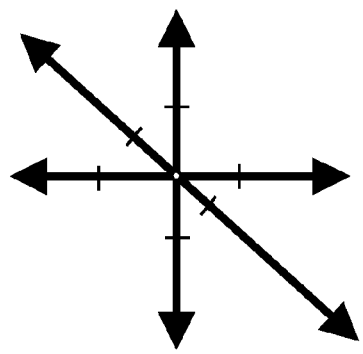

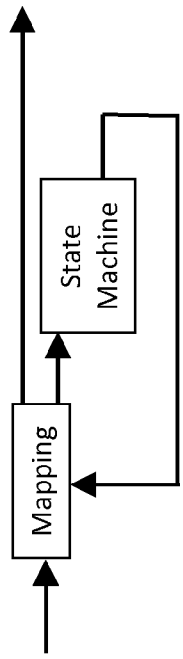
FIG. 21
FIG. 22
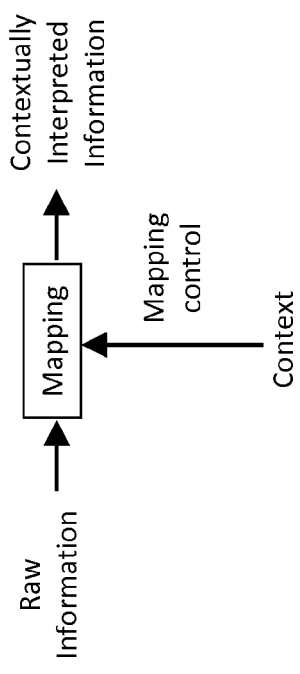
$G^P = \boxed{G^X \mid G^Y \mid G^Z}$
FIG. 23
$G^Q = \boxed{g_a \mid g_b \mid g_c \mid g_d \mid g_e}$
FIG. 24

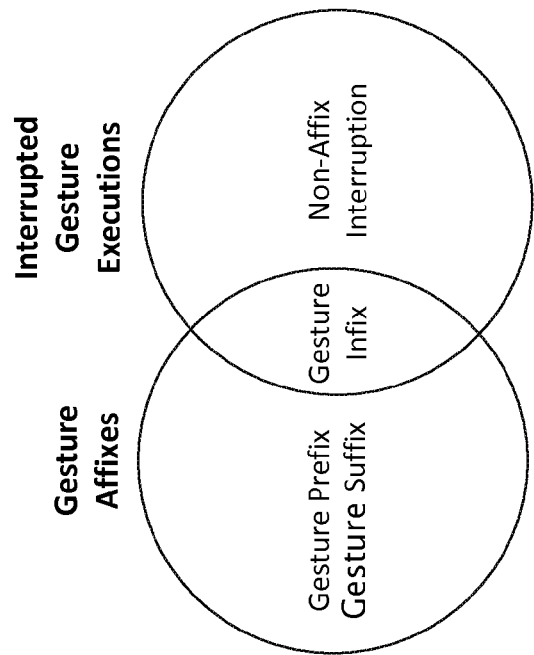
FIG. 26
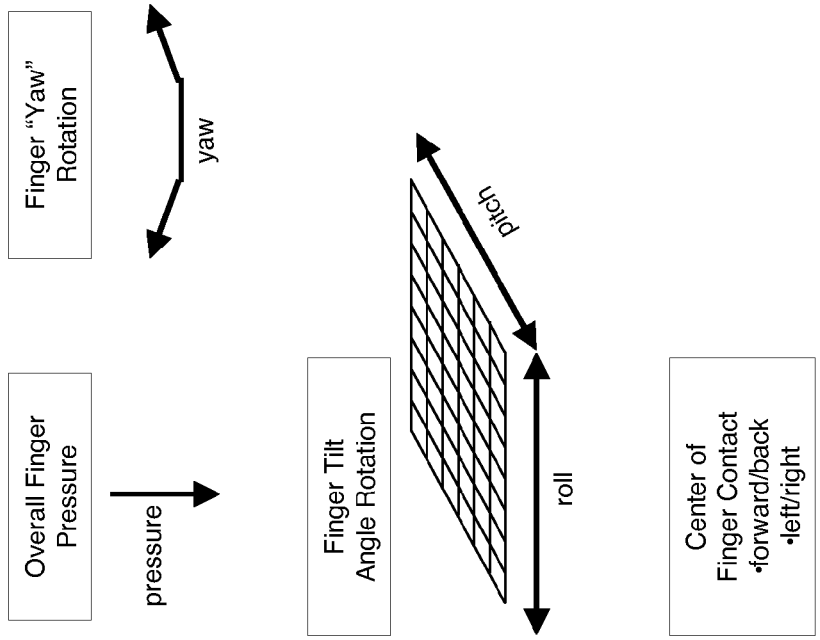
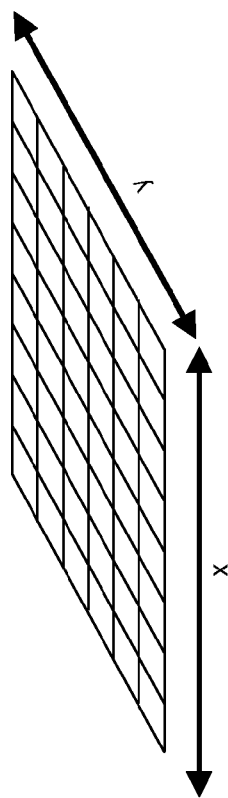
FIG. 25

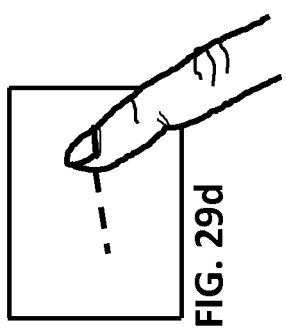
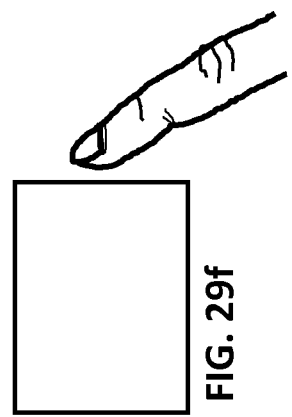
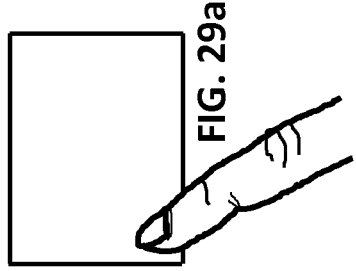
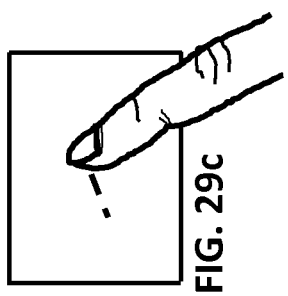
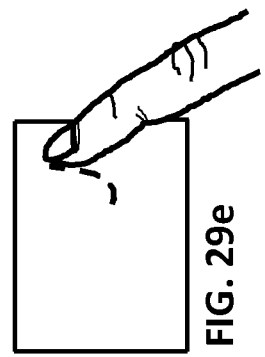

GENERAL USER INTERFACE GESTURE LEXICON AND GRAMMAR FRAMEWORKS FOR MULTI-TOUCH, HIGH DIMENSIONAL TOUCH PAD (HDTP), FREE-SPACE CAMERA, AND OTHER USER INTERFACES

CROSS REFERENCE TO RELATED APPLICATIONS

Pursuant to 35 U.S.C. §119(e), this application claims benefit of priority from provisional patent application Ser. No. 61/449,923, filed Mar. 7, 2011, and provisional patent application Ser. No. 61/482,606, filed May 4, 2011, the contents of each of which are hereby incorporated by reference herein in their entirety.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

The invention relates generally to the area of gesture-based user interfaces, and more specifically to the creation of grammars for gesture-based user interfaces, particularly in the context of touch-based user interfaces.

Until recent years the dominant form of Graphical User Interface (GUI) model for general-purpose computers has been (initially) the Direct Manipulation and Desktop Metaphor (see for example http://en.wikipedia.org/wiki/Direct_manipulation), often attributed to B. Shneiderman in 1983[1], and later their arguable descendent WIMP ("Window, Icon, Menu, Pointer/Pointing/Pull-Down/Pop-up") GUI (see for example http://en.wikipedia.org/wiki/History_of_the_graphical_user_interface and http://en.wikipedia.org/wiki/WIMP_(computing)). Many additional user interface mechanisms have been explored, and many of these (for example, speech recognition) map directly into the Direct Manipulation and Desktop Metaphor paradigm. The pointing devices employed notably include not only the computer mouse but a number of surrogate forms emulating the mouse metaphor, namely various trackballs, keyboard-sticks, touch-screens, and touchpads (including the Koala-Pad™ in 1984—see for example http://en.wikipedia.org/wiki/Koala_Pad). These touch-based computer interfaces (touch-screens and touchpads) indeed operated as mere stand-in emulations of computer mouse functionality.

It is noted that, prior to computer touch-screens and touchpads various elevator, machine, and appliance controls from the 1950's (and likely earlier) included touch-operated on-off switches, and various 1970's music synthesizers included touch-keyboards and one-dimensional touch "ribbon controllers."

Work on more sophisticated touch-based computer and control interfaces that accommodate and utilize touch-based gestures has a long history, some of it widely recognized (for example http://www.billbuxton.com/multi-touchOverview.htm) and less well-known such as the High Dimensional Touch Pad (HDTP) technology represented for example by (1999 priority date) U.S. Pat. No. 6,570,078, U.S. patent application Ser. No. 11/761,978, U.S. patent application Ser. No. 12/418,605, and some at least two dozen other related pending patent applications. The most well-known work is that of Wayne Westerman and his thesis professor John Elias. The approach that work took to touch-based gestures has since been incorporated into in a large number of Apple™ products, and subsequently widely adopted by large a number of other handheld, tablet, laptop, and other computing-based devices made by many product manufacturers.

Within this period of time there was a considerable amount of work and product relating to pen/stylus-based handwriting interfaces (see for example http://en.wikipedia.org/wiki/Pen_computing), some including a few early gesture capabilities (http://en.wikipedia.org/wiki/Pen_computing#Gesture_recognition).

More recently video-camera-based free-space hand-gesture input have appeared, It is noted that (1999 priority date) U.S. Pat. No. 6,570,078 teaches use of a video camera as an input device to deliver HDTP capabiities extended to free-space hand-gesture input.

Although the widely adopted approach to gesture-based multi-touch user interfaces developed by Westerman and Apple has become pervasive and extends the WIMP GUI operations to include a number of allegedly "new" metaphor-based specialty operations (such as "swipe," "stretch," "pinch," "rotate," etc), that approach is hardly the last word in touch-based user interfaces. The HDTP approach to touch-based user interfaces, represented for example by represented for example by U.S. Pat. No. 6,570,078, U.S. patent application Ser. No. 11/761,978, U.S. patent application Ser. No. 12/418,605, provides a framework that includes or supports today's widely adopted gesture-based multi-touch user interface features and further supports a wide range of additional capabilities which transcend and depart from today's widely adopted gesture-based multi-touch user interfaces.

A first aspect of the HDTP approach includes the capability for deriving more than the two-dimensional 'continuous-adjustment' user inputs than are provided by today's widely adopted gesture-based multi-touch user interface "geometric location" operations (such as X-Y location, "flick" X-Y location-change velocity, "flick" X-Y location-change angle). For example the HDTP approach to touch-based user interfaces can provide additional 'continuous-adjustment' user inputs such as:

Yaw-angle of a contacting finger, thumb, palm, wrist, etc.;
Roll-angle of a contacting finger, thumb, palm, wrist, etc.;
Pitch-angle of a contacting finger, thumb, palm, wrist, etc.;
Downward pressure of a contacting finger;
Spread angle between each pair of contacting finger(s), thumb, palm, wrist, etc.;
Differences in X location between each pair of contacting finger(s), thumb, palm, wrist, etc.;
Differences in Y location between each pair of contacting finger(s), thumb, palm, wrist, etc.;
Differences in downward pressure between each pair of contacting finger(s), thumb, palm, wrist, etc.;
Rates-of-change for the above.

These additional capabilities widely expand the number and types of gestural, geometric, and spatial-operation metaphors that can be provided by touch interfaces. Further, various types of conditional tests may be imposed on these additional 'continuous-adjustment' inputs, permitting productions of and associations with symbols, domains, modalities, etc.

Today's widely adopted gesture-based multi-touch user interfaces recognize the number of multiple-touch contacts with the touch interface surface. A second aspect of the HDTP approach to touch-based user interfaces are additional 'shape' user input recognitions distinguishing among parts of the hand such as:
Finger-tip;
Finger-joint;
Flat-finger;
Thumb;
Cuff;
Wrist;
Palm;
Left-hand;
Right-hand.

Today's widely adopted gesture-based multi-touch user interfaces recognize individual isolated gestures. A third aspect of the HDTP approach to touch-based user interfaces can provide yet other additional features such as:
Compound touch gestures;
Attributes of individual component elements comprised by a gesture such as:
 Order of individual component element rendering;
 Relative location of individual component element rendering;
 Embellishment in individual component element rendering (angle of rendering, initiating curve, terminating curve, intra-rendering curve, rates of rendering aspects, etc.);
Connected gestures;
Context-based interpretation/action/semantics;
Inheritance-based interpretation/action/semantics;
Syntactic grammars.

The present patent application, along with other associated co-pending U.S. patent cited herein, directs further attention to these topics, both in the context of HDTP technology as well as other user interface technologies including:
 Simple touch user interface systems found in handheld devices, laptops, and other mobile devices
 Video camera-based free-space gesture user interface systems In the case of the HDTP approach to touch-based user interfaces, these provide the basis for
 (1) a dense, intermixed quantity-rich/symbol-rich/metaphor-rich information flux capable of significant human-machine information-transfer rates and
 (2) an unprecedented range of natural gestural metaphor support.

The latter (1) and its synergy with the former (2) is especially noteworthy, emphasized the quote from the recent cover story in the February 2011 Communications of the ACM [2]:
 "Gestures are useful for computer interaction since they are the most primary and expressive form of human communication."

The next-generation user interface work in academia, as well as in video games, however, is now directing attention to video-camera-based free-space gesture input, owing great debts to the pioneering experiential/installation/performance-art-oriented real-time video-based computer control work of Myron Kruger. These camera-based free-space gesture input user interfaces will be providing a range of possibilities comprising, at least tabula rasa, ranges and possibilities not unlike those provided by the HDTP approach to touch-based user interfaces. (In fact (1999 priority date) U.S. Pat. No. 6,570,078, U.S. patent application Ser. No. 11/761,978 teach use of one or more video cameras as alternative input sensors to HDTP processing so as to respond to free-space hand gestures.)

However, it is not at this time clear whether the camera-based free-space gesture input user interface community will see these opportunities or simply incrementally adapt and build on WIMP frameworks, the Westerman/Apple approach, 3D extrapolations of desktops, etc. Additionally, these camera-based free-space gesture input user interface approaches have their own usage challenges (not the least of which including arm fatigue, input on/off detection ("Midas Touch problem") and computation challenges if trying to adopt rich-semantic inputs (for example, recognitions of ASL and other sign languages remains computationally out or reach even well-funded research labs loaded with computers [2]).

It is believed this effort, in addition to the role it provides to contemporary touch interfaces and HDTP technology, could deliver potential utility to next-generation touch interfaces and provide a framework and an example perhaps of possible value to the camera-based free-space gesture input user interface community as the possibilities and opportunities for camera-based free-space gesture input user interface technology and its applications are explored, developed, and formalized.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In an aspect of the invention, a method is provided for a multi-touch gesture-based user interface wherein a plurality of gestemes are defined as functions of abstract space and time and further being primitive gesture segments that can be concatenated over time and space to construct gestures. Various distinct subset of the gestemes can be concatenated in space and time to construct a distinct gestures.

In another aspect of the invention, real-time multi-touch gesture-based information provided by user interface is processed to at least a recognized sequence of specific gestemes and that the sequence of gestemes that the user's execution a gesture has been completed.

In another aspect of the invention, the specific gesture rendered by the user is recognized according to the sequence of gestemes.

In another aspect of the invention, many additional features are provided from this foundation.

In another aspect of the invention, gesture grammars are provided.

In another aspect of the invention, structured-meaning gesture-lexicon frameworks are provided.

In another aspect of the invention, gesture context frameworks are provided.

In another aspect of the invention, the use of gesture prosody is provided.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein:

FIG. 5 (also adapted from [3]) illustrates an example decomposition of cursive-style handwritten English-alphabet letters in terms of the example set of eighteen primitive handwriting "graphemes" depicted in FIG. 4a.

FIG. 14 depicts such a conditional test for a single parameter or rate value q in terms of a mathematical graph, separating the full range of q into three distinct regions.

FIG. 15a and FIG. 15b depict a representation of a conditional test for a two values (parameter and/or rate) in terms of a mathematical graph, separating the full range of each of the two values into three regions.

FIG. 16a and FIG. 16b depict a representation of a conditional test for a two values (parameter and/or rate) in terms of a mathematical graph, separating the full range of each of the three values into three regions.

FIG. 21 and FIG. 22 depict representations of one or more symbols may be designated as setting a context for interpretation or operation and thus control mapping and/or assignment operations on parameter, rate, and/or symbol values, and further depict representations of context-oriented and context-free production of parameter, rate, and symbol values.

FIG. 23 depicts an example representation of a predefined gesture comprised by a specific sequence of three other gestures.

FIG. 24 depicts an example representation of a predefined gesture comprised by a sequence of five recognized gestemes.

FIG. 25 depicts a representation of a layered and multiple-channel metaphor wherein the {x,y} location coordinates represent the location of a first point in a first geometric plane, and the {roll,pitch} angle coordinates are viewed as determining a second independently adjusted point on a second geometric plane.

FIG. 26 depicts a representation of the relations between gesture affixes and interrupted gesture executions. Interrupted gestures can also be more broadly supported by the present invention so as address covering non-affix cases.

FIG. 28a is a repeat of FIG. 27a. FIG. 28b is a repeat of FIG. 27b. FIG. 28e is a repeat of FIG. 27e. FIG. 28f is a repeat of FIG. 27f. FIG. 28i is a repeat of FIG. 27i.

FIG. 29a through FIG. 29f depict a variation on the example of FIG. 27a through FIG. 27j wherein the lift-off events associated FIG. 27c, FIG. 27g, and FIG. 27j are omitted altogether and semantic restrictions on gesteme sequences can be used to signify the completion of the second gesture and the prompt for the completion of the first gesture.

DETAILED DESCRIPTION

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

In the following description, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

1. Goal of Applicable and Enabling Structure

The imposing of a structure can be confining or empowering (and is usually to some extent both). For example, a large collection of digital logic chips and analog electronic components can be used in unsophisticated ways to create a large number of scattered devices or projects delivering dispersed and perhaps immense squandering of resource, time, and opportunity. An example of a more sophisticated use of the large collection of digital logic chips and analog electronic components can be to assemble a particular large-scale high-performance dedicated-purpose device (for example, a video processor such as a hardware codec). The utility of the resulting device could be limited by any number of aspects, including being unable to include or work with new innovations, the fickle evolution of video compression standards and use of video communications by the user, etc. Another example of a more sophisticated use of the large collection of digital logic chips and analog electronic components, however, is the creation of a general-purpose computing platform that could be used for a wide range of software and thus supporting a large number of valuable applications and able to maintain relevance over a range of evolutionary approaches.

Figure 1:
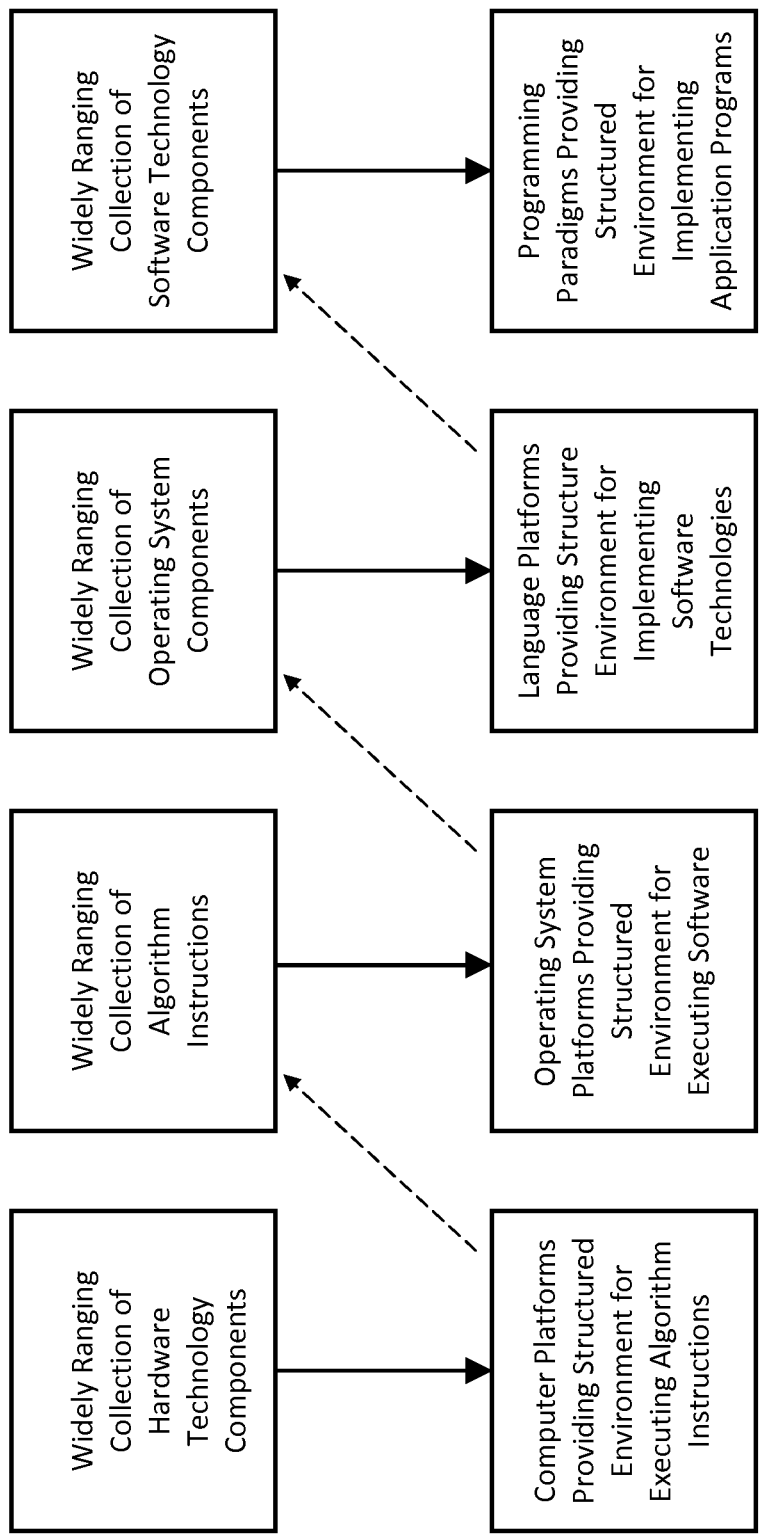
FIG. 1 depicts a representation of how the imposition of selected well-thought-through structures on computing hardware and software technologies has greatly facilitated the development of computing technology.

In the case of computing hardware and software technologies, the imposition of selected well-thought-through structures has greatly facilitated the development of computing technology. As described in FIG. 1:

A widely ranging collection of hardware technology components were advantageously structured to create computer platforms providing structured environment for executing algorithm instructions A widely ranging collection of algorithm instructions were advantageously structured to create operating system platforms providing structured environment for executing software A widely ranging collection of operating system components were advantageously structured to create language platforms providing structure environment for implementing software technologies;

A widely ranging collection of software technology components were advantageously structured to create programming paradigms providing structured environment for implementing application programs If the selected structures were not well-thought-through or not available at all, it would have been essentially impossible for computing hardware and software technologies to have progressed to the level that they have.

It is the latter example of imposing selected well-thought-through structures that is the goal of the proposed lexicon and grammar construction and formalism for gestures—sought is a conceptual, software, and technical 'platform' for tactile user interface lexicon and grammar frameworks that could be used for a wide range of configurations and thus supporting a large number of valuable applications and able to maintain relevance over a range of evolutionary approaches. That is, in the analogy, sought is a structure imposed on the analogous large collection of digital logic chips and analog electronic components (analogous to the capabilities of touch interfaces, particularly the HDTP approach to them) to built an analogous flexible general-purpose computer (analogous to the construction of formalisms for tactile user interface lexicon and grammar frameworks) that supports a large number of valuable applications and able to maintain relevance over a range of evolutionary approaches. One cannot have a flexible general-purpose computer without imposing structure on the collection of components, or by imposing an unsophisticated, overly-limiting or overly-specialized structure on the collection of components.

Ultimately the goal of command user interface arrangement is to balance the tensions among maximizing the information rate of communication from the human to the machine, maximizing the cognitive ease in using the user interface arrangement, and maximizing the physical ease using the user interface arrangement. These three goals are not always in strict opposition but typically involve some differences hence resulting in tradeoffs as suggested in FIG. 2.

Adoptions and adaptations of effective preceding approaches, leaving behind what is not relevant and adding new things where advantageous, is exactly the process Thomas Kuhn spelled out in his work on the structure of scientific revolutions—the approach presented here shall draw from known user interfaces, traditional linguistics, temporal logic, and other established thought in synergistic leverage to the additionally formalize the range and engineering of the capabilities provided by the example of the HDTP approach to touch-based user interfaces. To begin, some adoptions and adaptations of traditional linguistics are employed. At a high level the goal is to achieve a high-performance user interface leveraging inherent, intuitive, and metaphorical aspects of language, so seeking utility from within selected aspects of traditional linguistics theory.

2. Use of a Linguistics Framework

There are a number of more detailed reasons to engage the framework of traditional linguistics, among these including that many of the concepts have already been worked out, widely-accepted terminologies have already been established, and these concepts and terms provide a basis for drawing on the expertise of contemporarily linguists. Further, traditional generative linguistics programs, for example those influenced by Chomsky, Jackendoff, and many notable others appeal to a theme of there being a set of underlying human language capabilities which can be approached and approximated by various models (Extended Standard Theory, Y-Shape Models, Principles and Parameters, Government and Binding, etc.). Additionally, the goals sought by the charters of Natural Language and Universal Grammar offer additional resources, and numerous other formalisms (such as that of morphemes, syntactic structure, lexicon, writing systems, etc.; even phonetics) provide a good setting and collection of resources from which to begin this project. In particular, as an initial foundation, the follow notions will be employed (quick references to wiki summaries are provided):

Morphemes—http://en.wikipedia.org/wiki/Morpheme;
Language morphology frameworks using morphemes—http://en.wikipedia.org/wiki/Morphology (linguistics):
  Analytic language,
  Agglutinative language,
  Fusion language,
  Polysynthetic language;
Phonemes/graphemes (by analogy)—http://en.wikipedia.org/wiki/Phoneme, http://en.wikipedia.org/wiki/Grapheme;
Orthography/writing systems—http://en.wikipedia.org/wiki/Orthography, http://en.wikipedia.org/wiki/Writing_system;
Phonetic onomatopoeia (by analogy)—http://en.wikipedia.org/wiki/Onomatopoeia;
Logography—http://en.wikipedia.org/wiki/Logography;
Clitics (particular endoclitics)—http://en.wikipedia.org/wiki/Clitic;
Lexicon—http://en.wikipedia.org/wiki/Lexicon;
Punctuation—http://en.wikipedia.org/wiki/Punctuation;
Prosody—http://en.wikipedia.org/wiki/Prosody_(linguistics);
Syntactic analysis/parsing—http://en.wikipedia.org/wiki/Parsing;
Lexical categories—http://en.wikipedia.org/wiki/Lexical category;
Phrases, clauses, and sentences;
Syntax and sentence grammar—http://en.wikipedia.org/wiki/Grammar;
Context.

However, the capabilities of touch interfaces, at least as provide by the HDTP approach to touch-based user interfaces, can include features involving other types of formalisms, for example:

adaptations of temporal logic (as will be explained);
standard-input/standard-output;
multi-threaded/parallelism.

So with this foreground preparation in place, the construction of formalisms for tactile user interface lexicon and grammar frameworks will begin.

3. Gesture Structure, Constituents, Execution, and Machine Acquisition

A tactile gesture is a bit like traditional writing in some ways and differs from writing in other ways. Like traditional writing a tactile gesture involves actions of user-initiated contact with a surface and is rendered over a (potentially reusable) region of physical surface area. The term "execution" will be used to denote the rendering of a tactile gesture by a user via touch actions made on a touch interface surface.

In various implementations the execution of a tactile gesture by a user may (like traditional writing) or may not (unlike writing) be echoed by visible indication (for example a direct mark on the screen). In various implementations the symbol execution of a tactile gesture by a user may comprise spatially isolated areas of execution (in analogy with the drawing of block letters in traditional writing) or may comprise spatially isolated areas of symbol execution (in analogy with the drawing of sequences of cursive or other curve-connected/line-connected letters in traditional writing).

However, unlike traditional writing, a tactile gesture can include provisions to capture temporal aspects of its execution (for example the speed in which it is enacted, the order in which touch motions comprising the gesture are made, etc.). Also unlike traditional writing, the result of a tactile gesture can include a visually-apparent indirect action displayed on a screen responsive to a meaning or metaphor associated with the tactile gesture. In a way, these aspects are a bit like speech or a speech interface to a computer—time is used rather than space for the rendering/execution, and the (visual) response (of a machine) can be one of an associated meaning.

Figure 2:
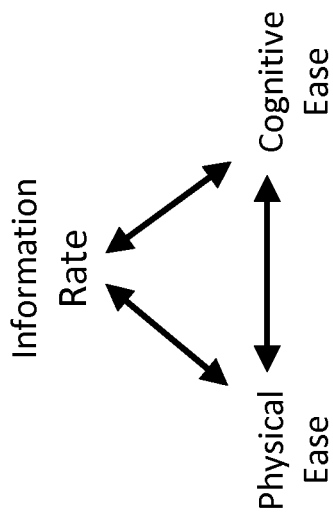
FIG. 2 depicts a representation of the tensions among maximizing the information rate of communication from the human to the machine, maximizing the cognitive ease in using the user interface arrangement, and maximizing the physical ease using the user interface arrangement
Figure 3:
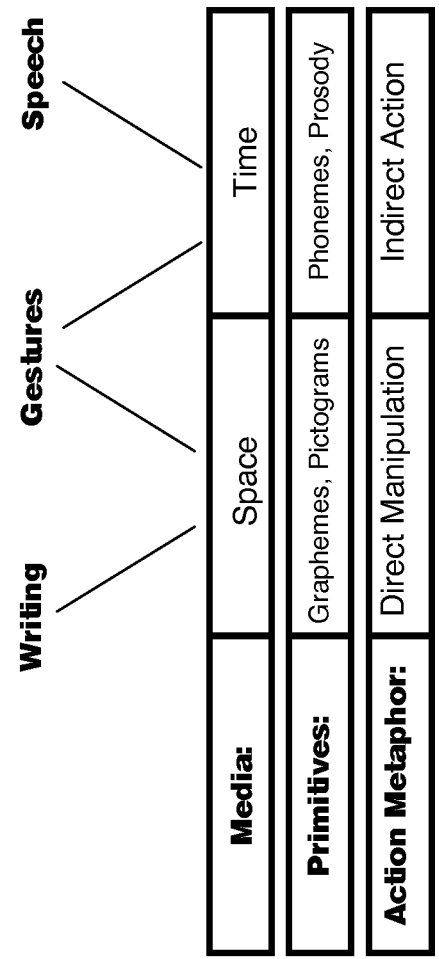
FIG. 3 depicts a representation of example relationships of traditional writing, gesture, and speech with time, space, direct marks, and indirect action.

FIG. 3 illustrates these example relationships of traditional writing, gesture, and speech with time, space, direct marks, and indirect action. Of course it is likely possible to construct or envision possible speech and writing systems that defy, extend, or transcend the relationships depicted in FIG. 2, but for the moment with no ill-will or limited-thinking intended these will, at least for now, be regarded as fringe cases with respect to the gesture lexicon and graphics framework presented herein.

3.1 Phoneme, Grapheme, "Gesteme"

Like traditional writing and speech, tactile gestures can be comprised of one or more constituent "atomic" elements. In the formal linguistics of speech, these constituent "atomic" elements are known as phonemes. In the formal linguistics of traditional writing, the constituent "atomic" elements are termed graphemes (see for example http://en.wikipedia.org/wiki/Grapheme).

Accordingly, in this construction the one or more constituent "atomic" elements of gestures will be called "gestemes;" examples include isolated stroke lines, isolated curves, etc. For example, a gesture that is spatially rendered by tracing out an "X" or "+" on a touch surface would (at least most naturally) comprise an action comprising two stroke lines. Gesteme-based gesture structuring, recognition, processing are further treated in co-pending U.S. Patent Application 61/567,626.

In traditional (at least Western) writing, the order in which such strokes are rendered by the user, the time it takes to render each stroke ("gesteme"), and the time between making the two strokes, and anything else that is done in a different spatial area (such as drawing another letter) between making the two strokes are all immaterial as the information is conveyed by the completed "X" or "+" marking left behind after the execution. The HDTP approach to touch-based user interfaces, however, allows for use of:
the time it takes to render each gesteme;
the time between rendering a pair of gestemes;
anything else that is done in a different spatial area (such as the drawing of another symbol) between rendering a pair of gestemes.

3.1.1 Relating Gestemes to Example "Graphemes" for Representing Cursive-Style Handwritten English-Alphabet Letters As discussed above in conjunction with FIG. 3, gestures have some attributes that are similar to speech and other attributed that are similar to writing. Thus it would be expected that gestemes would have some attributes of graphemes.

Figure 4A:
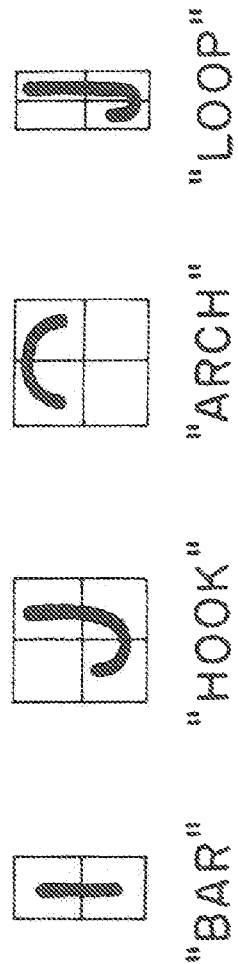
FIG. 4a and FIG. 4b (adapted from [3]) illustrates an example set of four primitive handwriting segment shapes that could be used as components for representation of cursive-style handwritten English-alphabet letters.
Figure 4B:
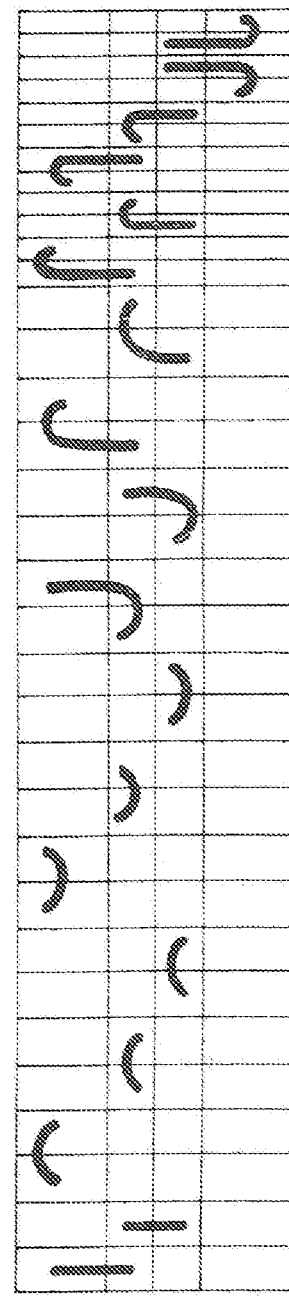

Although there are other references to draw from regarding graphemes, FIG. 4a, adapted from a 1961 paper by M. Eden [3], illustrates an example set of four primitive handwriting segment shapes that could be used as components for representation of cursive-style handwritten English-alphabet letters. FIG. 4b, also adapted from [3], illustrates an example an example set of eighteen primitive handwriting "graphemes" created from various translations and mirror-symmetry transformations of the example set of four primitive handwriting segment shapes depicted in FIG. 4a.

Figure 5:
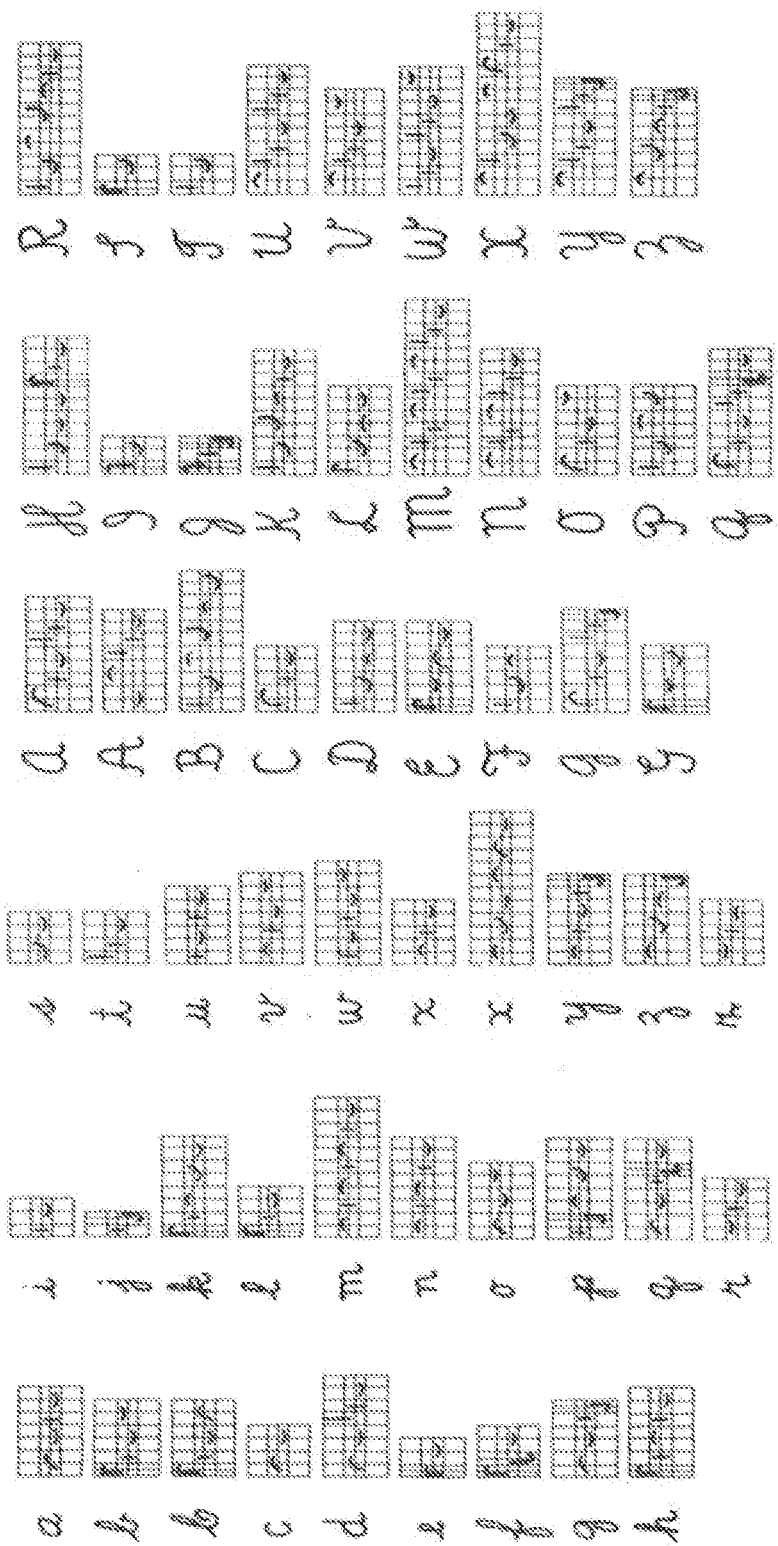

FIG. 5, also adapted from [3], illustrates an example decomposition of cursive-style handwritten English-alphabet letters in terms of the example set of eighteen primitive handwriting "graphemes" depicted in FIG. 4a. In this example (Eden) system, the simultaneous presence of specific combinations of the eighteen primitive handwriting "graphemes" signifies a specific cursive-style handwritten English-alphabet letter.

FIG. 3 illustrates an example comparison of gestures with writing and speech. Speech is rendered over time while writing is rendered over space. Gestures have aspects of both writing and speech, for example being rendered over space and over time. In relating this to the example provided in FIG. 5, the example (Eden) system employs simple combinational logic operations of the truth-values of the presence of the graphemes of FIG. 4b. In general (and in contrast), a gesture will replace the simple combinational logic operations on the presence of specific graphemes used in writing with more complex "temporal logic" operations on the presence of specific graphemes. However, the temporal aspect of a rendered gesture can rightfully be included in the structure of primitive elements of gestures, as considered below and elsewhere herein.

3.1.2 Relating Gestemes to Phonemes: Gesteme Delineation within a Gesture

As discussed above in conjunction with FIG. 3, gestures have some attributes that are similar to speech and other attributed that are similar to writing. Thus it would be expected that gestemes would have some attributes of phonemes.

The following analogies with the traditionally considered phonemes of spoken language can provide useful perspective on defining gesteme delineation within a gesture.

First, in analogously relating a gesteme to a phoneme comprising beginning an ending consonants surrounding a (mono)vowel, diphthong, or more general form of gliding vowel:

|  | Consonant-Enveloped Phoneme | Gesteme |
| --- | --- | --- |
| Start | Starting consonant | Starting motion and/or position |
| Internal | (mono)vowel, diphthong, or gliding vowel | Dynamic activity |
| End | Ending consonant | Ending motion and/or position |

Second, in analogously relating a gesteme to a phoneme comprising a beginning consonant followed by a (mono)vowel, diphthong, or more general form of gliding vowel:

|  | Consonant-Leading Phoneme | Gesteme |
| --- | --- | --- |
| Start | Starting consonant | Starting motion and/or position |
| Internal and End | (mono)vowel, diphthong, or gliding vowel | Dynamic activity further comprising the ending motion and/or position |

Third, in analogously relating a gesteme to a phoneme comprising a (mono)vowel, diphthong, or more general form of gliding vowel followed by an ending consonant:

|  | Consonant-Consluding Phoneme | Gesteme |
| --- | --- | --- |
| Start and Internal | (mono)vowel, diphthong, or gliding vowel | Starting motion and/or position further comprising continuing dynamic activity |
| End | Ending consonant | Ending motion and/or position |

Forth, in analogously relating a gesteme to a phoneme comprising only a (mono)vowel, diphthong, or more general form of gliding vowel:

|  | Consonant-Free Phoneme | Gesteme |
| --- | --- | --- |
| Start, Internal, and End | (mono)vowel, diphthong, or gliding vowel | Starting motion and position also comprising continuing dynamic activity |

Of these four analogies, the first or fourth would typically provide an adequate framework for general use.

3.2 Gestures

In the construction of the formalism, a gesture may be equated to the role of a word or word group or compound work acting as a word. This approach will be used for the moment, but with the incorporation of additional aspects of gesture rendering the linguistic domain and linguistic function of a gesture can be expanded to include entire multi-element noun phases, verb phrases, etc. (as will be considered in later sections of this document pertaining to grammar).

3.2.1 Gesture Composition from Gestemes

The HDTP approach to touch-based user interfaces also allows for a single gestemes to be used as a gesture. However, the HDTP approach to touch-based user interfaces more commonly allows for the concatenation of two or more gestemes to be sequentially rendered (within the delimiters of a gesture) to form a gesture.

In some cases, gestemes may be defined in such a way that natural joining is readily possible for all, most, or some combinations of consecutive pairs of gestemes. In some cases, some form of shortening or bridging may be used to introduce economy or provide feasibility in the joining pairs of consecutive gestemes.

3.2.2 Gesteme Sequencing within the Rendering of a Gesture

The HDTP approach to touch-based user interfaces also allows for there to be additional content to be imposed into/onto the individual gestemes used to render even such simple "X" or "+" gestures. For example:

The order in which the user renders the two strokes can be ignored, or could instead be used to convey meaning, function, association, etc.;

The absolute or relative time the user takes to render each stroke can be ignored, or could instead be used to convey a quantity, meaning, function, association, etc.;

The absolute or relative time the user takes between the rendering of each stroke can be ignored, or could instead be used to convey a quantity, meaning, function, association, etc.

An action (for example, a tactile action) taken by the user between the rendering of each stroke can be ignored, or could instead be used to convey a quantity, meaning, function, association, etc.

The temporal aspects involved in each of the above examples brings in the need for an adapted temporal logic aspect to formalisms for tactile user interface lexicon and grammar frameworks should these temporal aspects be incorporated. Depending upon the usage, the temporal logic aspect framework would be used to either distinguish or neglect the rendering order of individual gestemes comprising a gesture.

3.2.3 Delimiters for Individual Gestures

In the rendering of speech, delimiting between individual words is performed through use of one or more of the following:

Prosody:
  Temporal pause;
  Changes in rhythm;
  Changes in stress;
  Changes in intonation.
Lexigraphics (an individual word is unambiguously recognized, and the recognition event invokes a delineating demarcation between the recognized word and the next word to follow).

In the rendering of traditional writing, delimiting between individual words is performed via gaps (blank spaces roughly the space of a character).

The HDTP approach to touch-based user interfaces provides for delimiting between individual temporal tactile gestures via at least these mechanisms:

Time separation between individual tactile gestures;
Distance separation between individual tactile gestures;
For joined strings of individual tactile gestures:
  Temporal pause separation;
  Logographically separation;
  Lexigraphically separation (an individual tactile gesture is unambiguously recognized, and the recognition event invokes a delineating demarcation between the recognized tactile gesture and the next tactile gesture to follow);

Special ending or starting attribute to gestures;
Special delimiting or entry-action gesture(s)—for example lift-off, tap with another finger, etc.
3.2.4 "Intra-Gesture Prosody"

Additionally, because of the temporal aspects of gestures and the gestemes they comprise, aspects of gesture rendering over time can be modulated as they often are in speech, and thus gestures also admit a chance for formal linguistic "prosody" to be imposed on gestures for conveyance of additional levels of meaning or representations of a parameter value. Intra-gesture and Inter-gesture prosody are further treated in co-pending U.S. Patent Application 61/567,626.

The HDTP approach to touch-based user interfaces allows for there to be yet other additional content to be imposed in such simple "X" or "+" gestures. For example:

At least one contact angle (yaw, roll, pitch) of the finger(s) used to render each of the strokes of the "X" or "+" gesture;

How many fingers used to render each of the strokes of the "X" or "+" gesture;

Embellishment in individual component element rendering (angle of rendering, initiating curve, terminating curve, intra-rendering curve, rates of rendering aspects, etc.);

Variations in the relative location of individual component element rendering;

What part(s) of the finger or hand used to render each of the strokes of the "X" or "+" gesture;

Changes in one or more of the above over time.

A 'natural' potential name for at least some of these could be "intra-gestural prosody." This term could be extended to include the entire list, or another term could be forum 3.3 Summarizing Comparative View The table below comparatively summarizes selected aspects the constructs made thus far for gestures in relation to the corresponding attributes in established phonetic and orthographic linguistics.

|  | Written Word | Gesture | Spoken Word |
| --- | --- | --- | --- |
| Primitive Element | grapheme | "gesteme" | phoneme |
| Delimiters | gaps and punctuation | prosody/lexicon | prosody/lexicon |
| Serializing Media | space | time and space | time |
| Feedback | direct marking | direct marking and/or indirect action | indirect action |

3.4 Relations to Earlier Pen-Based Interfaces and Handwriting Recognition

In that gestures involve time-varying touch actions (typically executed with a finger), it is also appropriate to consider relations between touch-based gestures and earlier efforts directed to pen-based interfaces and real-time handwriting recognition (typically executed with a stylus). An early (1961) example of an effort directed to handwriting recognition is that of Eden [3] which will be considered later.

4. Gesture Executions and their Renderings in Measured Signal Space

Figure 6:
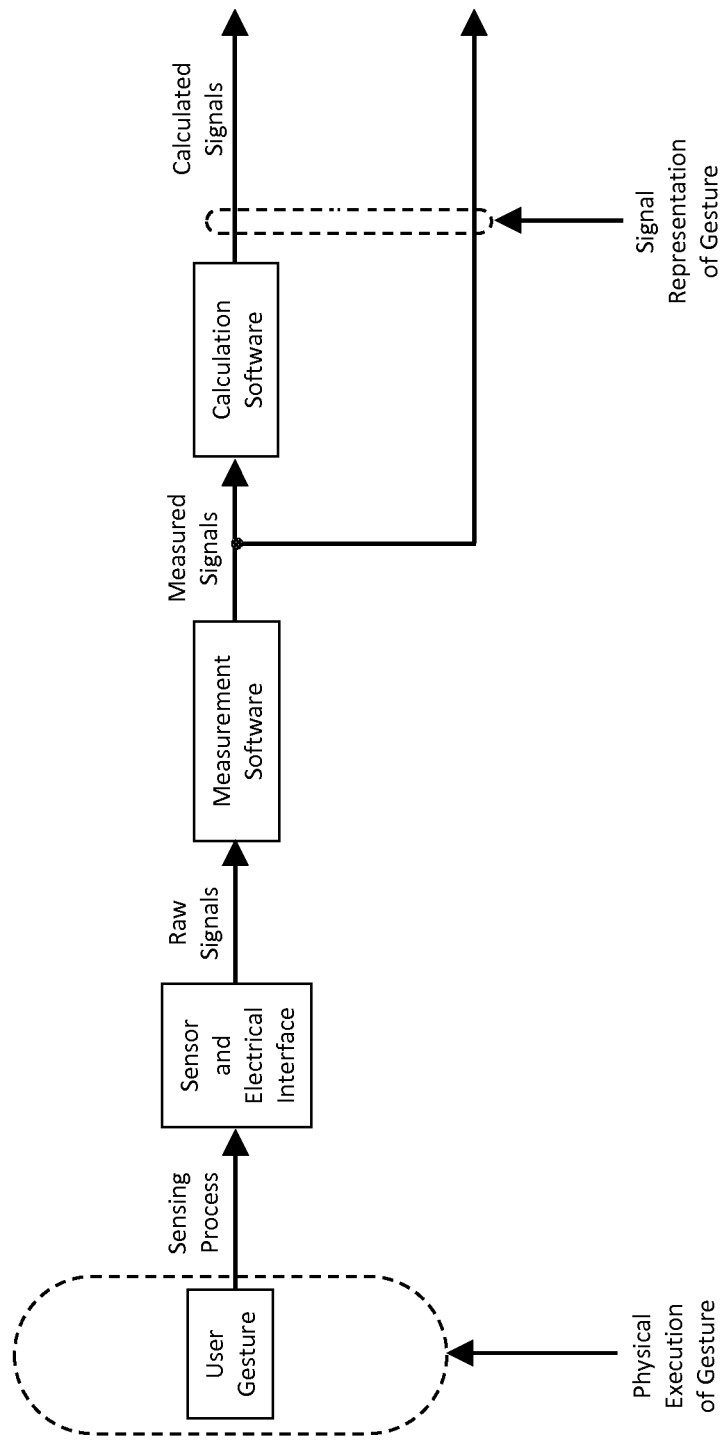
FIG. 6 depicts a representation of a general user interface arrangement relevant to the present invention.

FIG. 6 depicts a representation of a general user interface arrangement relevant to the present invention. Physical executions of gestures by a user are observed through a sensing process by a sensor. The sensor and its electrical interface provide raw signals (analog, digital, byte streams, image frames, etc.) to software elements, likely including software drivers (not shown) and measurement software algorithms. The measurement software algorithms produce measured signals (which can also be viewed and referred to as "measurement signals," "measured values," and "measurement values") that are made available for subsequent processing and for use by applications. The measured signals (or "measurement signals," "measured values," and "measurement values") are also presented to calculation software algorithms. The calculation software algorithms produce calculated signals (which can also be viewed and referred to as "calculated values") that are made available for subsequent processing and for use by applications.

As taught in U.S. Pat. No. 6,570,078 and U.S. patent application Ser. No. 11/761,978:

A touch posture can be viewed as a recognized tactile image pattern (for example as measured by a touch sensor).

A touch gesture can be viewed as a time-varying tactile image pattern with recognized dynamic changes over time (such as a finger flick, single-finger double-tap, etc.).

It is also noted that U.S. Pat. No. 6,570,078 and U.S. patent application Ser. No. 11/761,978 extend these notions from touch sensors to include gestures rendered as verbal hand signals (for example as measured by a video camera) as well as, for example, facial expressions and lip movements.

In a general view, then:

From the user experience viewpoint, a gesture is rendered by a user as a time-varying pattern or trajectory of movement in the physical space measured or observed by the user interface sensor.

From the machine viewpoint, a gesture as measured by an associated sensor can be represented as a time-varying pattern or trajectory in a measured signal space.

For example, a touch-based finger flick, wherein a finger contact starts in a first (initiating) measured location on a touch surface, and subsequently moves remaining in contact with the touch surface to a second (terminating) measured location within a predefined minimum interval of time, creates a corresponding trajectory in measured signal space.

Figure 7A:
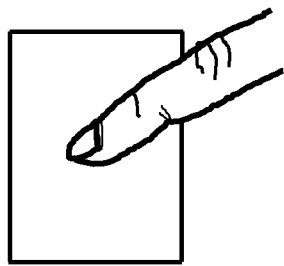
FIG. 7a through FIG. 7c depict representations of an example touch-based single-finger "finger-flick" gesture, wherein a finger makes physical contact begins in a first (initiating) location on a touch surface, and moves remaining in contact with the touch surface to a second (terminating) location roughly along a straight-line path within a predefined minimum interval of time.
Figure 7B:
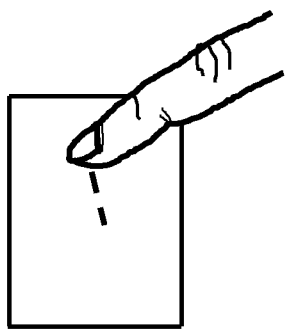
Figure 7C:
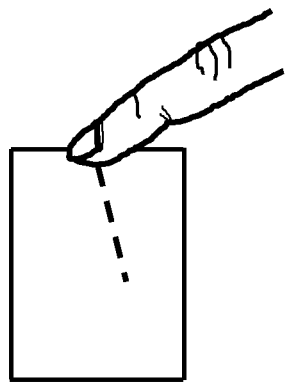

Further as to this example, FIG. 7a through FIG. 7c depict representations of an example touch-based single-finger "finger-flick" gesture, wherein a finger makes physical contact begins in a first (initiating) location on a touch surface, and moves remaining in contact with the touch surface to a second (terminating) location roughly along a straight-line path within a predefined minimum interval of time.

Figure 8A:
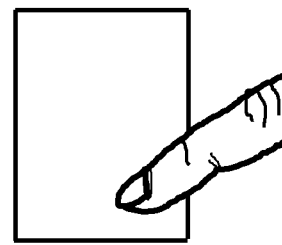
FIG. 8a through FIG. 8c depict representations of an example touch-based single-finger hook-shaped gesture, wherein a finger makes physical contact begins in a first (initiating) location on a touch surface, and moves remaining in contact with the touch surface along hook-shaped path to a second (terminating) location within a predefined minimum interval of time.
Figure 8B:
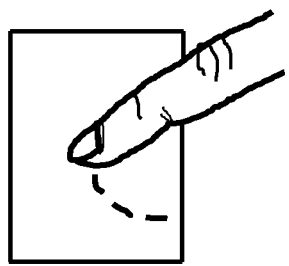
Figure 8C:
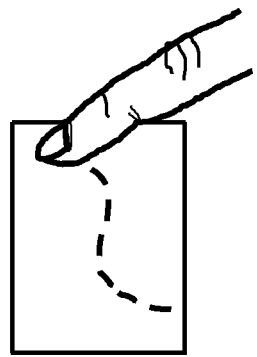

As another example, FIG. 8a through FIG. 8c depict representations of an example touch-based single-finger hook-shaped gesture, wherein a finger makes physical contact begins in a first (initiating) location on a touch surface, and moves remaining in contact with the touch surface along hook-shaped path to a second (terminating) location within a predefined minimum interval of time.

Figure 10:
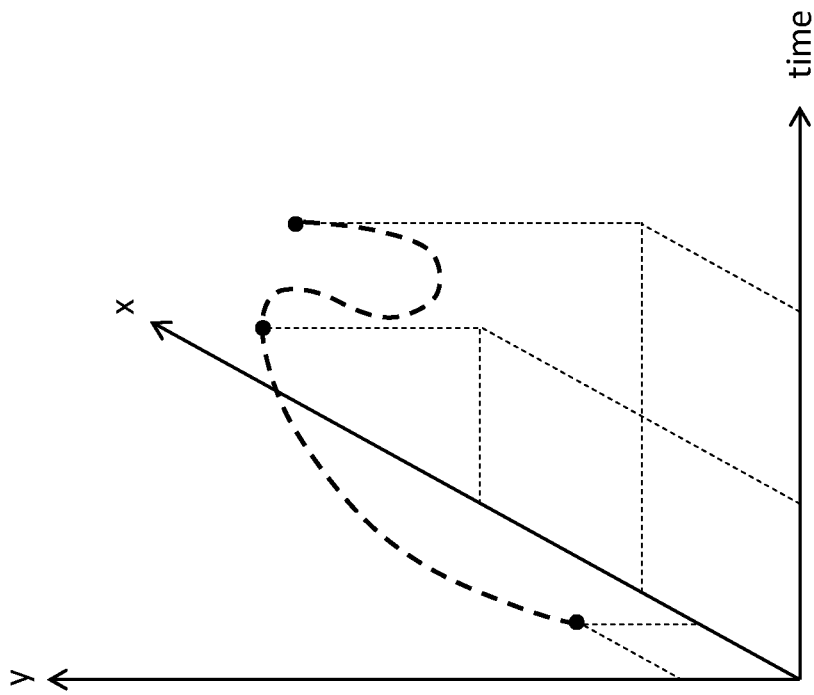
FIG. 10 depicts an example signal-space representation of the single-finger hook-shaped gesture represented by FIG. 8a through FIG. 8c, wherein a signal-space trajectory starts in a first (initiating) signal-space location and changes values to a second (terminating) signal-space location within a predefined minimum interval of time.
Figure 9:
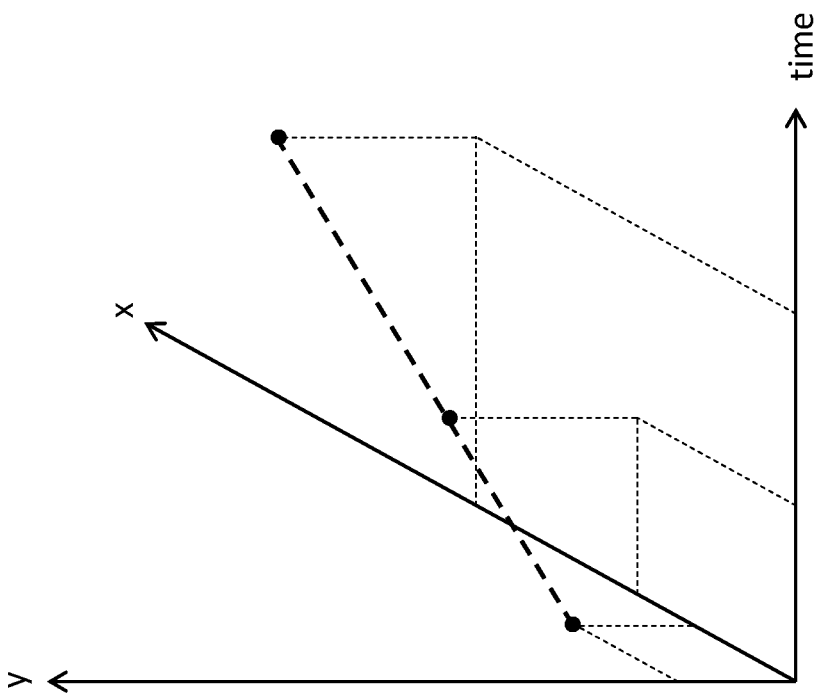
FIG. 9 depicts an example signal-space representation of the single-finger "finger-flick" gesture represented by FIG. 7a through FIG. 7c, wherein a signal-space trajectory starts in a first (initiating) signal-space location and changes values to a second (terminating) signal-space location within a predefined minimum interval of time.

FIG. 9 depicts an example signal-space representation of the single-finger "finger-flick" gesture represented by FIG. 7a through FIG. 7c, wherein a signal-space trajectory starts in a first (initiating) signal-space location and changes values to a second (terminating) signal-space location within a predefined minimum interval of time. Similarly, FIG. 10 depicts an example signal-space representation of the single-finger hook-shaped gesture represented by FIG. 8a through FIG. 8c, wherein a signal-space trajectory starts in a first (initiating) signal-space location and changes values to a second (terminating) signal-space location within a predefined minimum interval of time.

The concepts of represented in FIG. 7a through FIG. 7c, FIG. 8a through FIG. 8c, FIG. 9, and FIG. 10, are purely simple representative examples readily more generally extended to comprise more dimensions, parameters, and/or other types of measurements or values calculated from measured values for arbitrary sensors, gesture actions, and signal spaces. Accordingly, the invention is hardly limited to the examples represented in FIG. 1a through FIG. 1c, FIG. 8a through FIG. 8c, FIG. 9, and FIG. 10. As one example extension, the signal-space can be expanded to include rates of change (such as velocity and/or acceleration) of calculated from measured values. As another example extension, an HDTP or other high-dimensional gesture user interface arrangement such as those taught in U.S. Pat. No. 6,570,078, U.S. patent application Ser. Nos. 11/761,978, and 12/418,605, can be used as a user interface paradigm. Such arrangements expand and/or alter the number and/or type of measurements or values calculated from measured values for more arbitrary types of sensors, gesture actions, and signal spaces.

As taught in U.S. patent application Ser. No. 12/418,605, one or more measured or calculated values and/or the rate of change over time of one or more of these measured or calculated values can be individually, in combination, or within a numerical computation, submitted to one or more threshold tests, wherein the outcomes of the threshold tests can be treated as symbols. Accordingly, in a simple implementation, symbols thus created by threshold tests that do not comprise threshold tests on rates of change can be viewed as postures, while symbols created by threshold tests that do comprise threshold tests on rates of change can be viewed as gestures. In more sophisticated implementation, symbols created by threshold tests that comprise threshold tests requiring rates of change to be higher than a reference value can be viewed as gestures, while symbols created by threshold tests that comprise threshold tests requiring rates of change to be lower than a (same of different) reference value can be viewed as postures. U.S. patent application Ser. No. 12/418,605 also teaches that the threshold tests can comprise those wherein the velocity or acceleration of a measured value or calculated value exceeded a specified reference value. Additionally, U.S. patent application Ser. No. 12/418,605 also teaches the generation of symbols by shape recognition functions, and that one or both of threshold tests and shape recognition can be adapted to generate more than one symbol at a time (for example, several conditions may be satisfied at the same moment).

Alternatively, a symbol is determined by the outcome of a vector quantizer applied to one or more measured or calculated value(s) responsive to a user interface sensor.

Alternatively, a symbol is determined by the outcome of a matched filter applied to one or more measured or calculated value(s) responsive to a user interface sensor.

In general, each individual gesture comprises some sort of gesture-beginning and corresponding gesture-end. For example, in one embodiment a gesture-beginning can be defined as the event of the beginning of measured contact with a touch sensor for a contiguous interval of time and the corresponding gesture-end can be defined as the event of the ending of measured contact with a touch sensor for that contiguous interval of time. As another example, in an embodiment a gesture-beginning can be defined as the event of the rate of change of at least one measured or calculated value exceeding a reference value and the corresponding gesture-end can be defined as the event of the rate of change of at least one measured or calculated value dropping below a (same or different) reference value. As yet another example, aspects of the two preceding embodiments can be logically combined, for example using a logic operation (such as "AND" or "OR") on measured contact events and rate of change events. As yet another example, in an embodiment a gesture-beginning can be defined as the event of generation of a designated symbol and the corresponding gesture-end can be defined as the event of generation of a (same or different) designated symbol. As yet another example, aspects of the last embodiment and first two preceding embodiments can be logically combined, for example using a logic operation (such as "AND" or "OR") on two or more measured contact events, rate of change events, and symbol generation events.

Figures 11, 12:
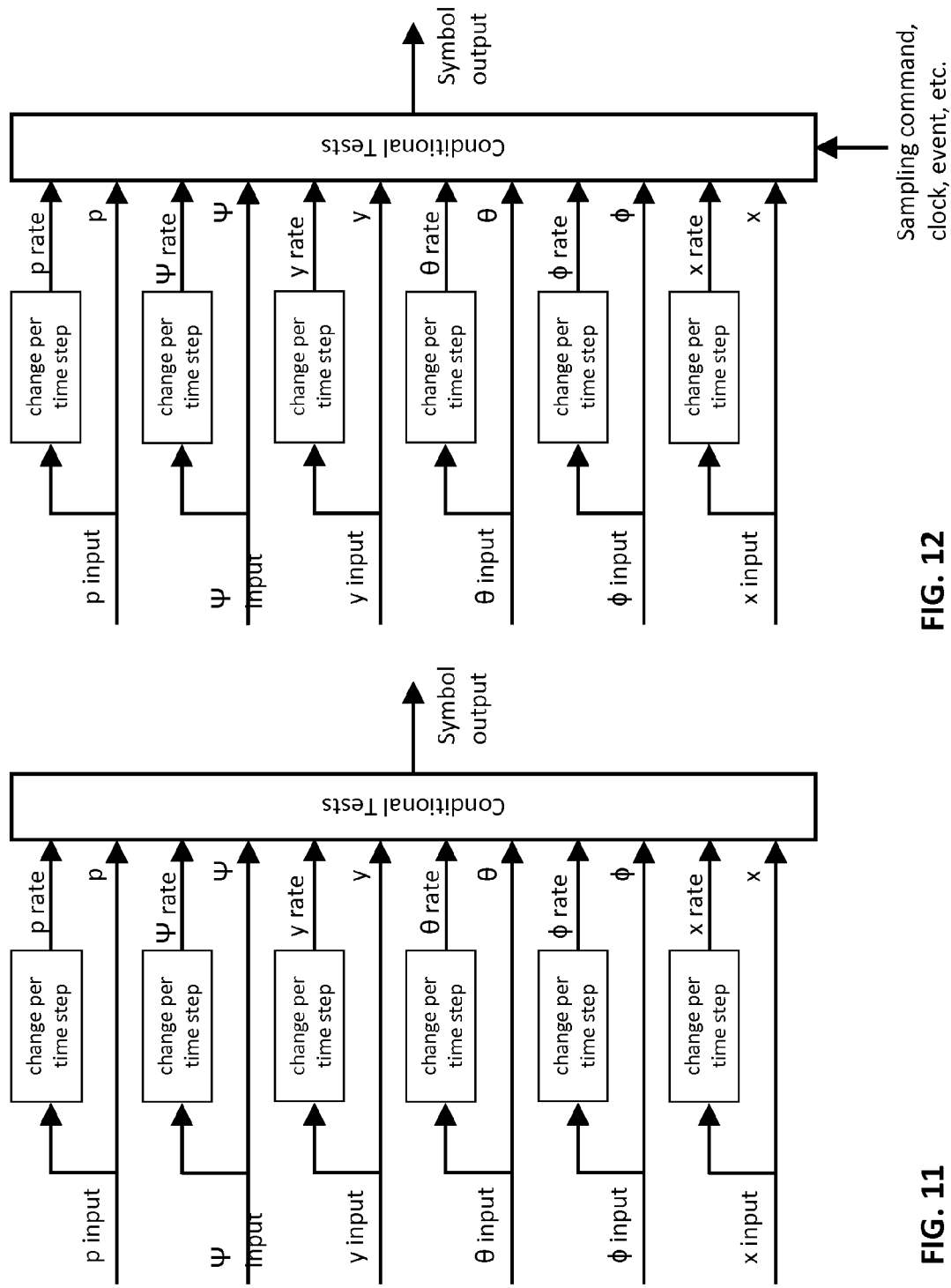
FIG. 11 depicts an example symbol generation arrangement for generating a sequence of symbols from (corrected, refined, raw, adapted, renormalized, etc.) real-time measured parameters values provided by other portions of an HDTP system.
FIG. 12 depicts a modification of the exemplary arrangement of FIG. 11 wherein symbol can be generated only under the control of a clock or sampling command, clock signal, event signal, or other symbol generation command.

5. Example Signal Spaces, Symbol Generation, and Parameter Generation in Simple and High-Dimensional User Interfaces FIG. 11 depicts an example symbol generation arrangement for generating a sequence of symbols from (corrected, refined, raw, adapted, renormalized, etc.) real-time measured parameters values provided by other portions of an HDTP system. Referring to FIG. 11, one or more (here all are shown) of (corrected, refined, raw, adapted, renormalized, etc.) real-time measured values and/or calculated values of HDTP parameters associated with a tactile sensor blob or constellation of blobs (here these are represented by the set of measured values and/or calculated values of finger posture parameters $\{x, y, p, \phi, \theta, \psi\}$ (these corresponding respectively to left-right, forward-back, downward pressure/displacement, roll angle, pitch angle, and yaw angle of the finger with respect to the touch sensor surface) are differenced, numerically differentiated, etc. with respect to earlier values so as to determine the rate of change (shown here per time step although this could be per unit time, a specified number of time steps, etc.).

Further details of HDTP output parameters responsive, for example, to touch by the human hand is provided in at least the following co-pending patent applications:

U.S. patent application Ser. No. 12/724,413;
U.S. patent application Ser. No. 13/038,372;
U.S. patent application Ser. No. 13/180,512;
U.S. Patent Application 61/506;
U.S. Patent Application 61/567,626;
U.S. Patent Application 61/522,239;
U.S. patent application Ser. No. 13/093,834.

Alternatively, or in other types of user interface arrangements, a greater or lesser number and/or alternate collection of parameters can be used).

Both the real-time measured values of HDTP output parameters and one or more rate of change outputs are provided to a plurality of conditional tests. In one implementation or mode of operation, none of these conditions from the plurality of conditional tests overlap. In other implementations or modes of operation, at least two of the conditions from the plurality of conditional tests overlap.

Additionally, the invention provides for conditions that are equivalent to the union, intersection, negation, or more complex logical operations on simpler conditional tests. For example, a conditional test comprising an absolute value of a variable can be implemented as a logical operation of simpler conditional test. Note this is equivalent to allowing a symbol to be associated with the outcome of a plurality of tests, also provided for by the invention in more general terms.

In the example implementation depicted in FIG. 11, each time a condition is met a symbol corresponding to that condition is generated as an output. Note that in principle more than one symbol can be generated at a time.

In some implementations (for example, if none of the conditions overlap) at most one symbol can be generated at any given moment. The symbol can be represented by a parallel or serial digital signal, a parallel or serial analog signal, a number, an ASCII character, a combination of these, or other representation. In some implementations the symbol is generated when the condition is first met. In other implementations, the symbol is maintained as a state throughout the time that the condition is met. Note that it is possible in some implementations for no symbol to be generated (for example in some implementations if no conditions have been met, or in some implementations if conditional test outcomes have not changed since an earlier symbol was generated, etc.).

In other implementations, a symbol can be generated only under the control of a clock or sampling command, clock signal, event signal, or other symbol generation command. FIG. 12 depicts a modification of the exemplary arrangement of FIG. 11 wherein symbol can be generated only under the control of a clock or sampling command, clock signal, event signal, or other symbol generation command.

In some implementations or modes of operation, some symbols are generated by the approach depicted in FIG. 11 while other symbols are generated by the approach depicted in FIG. 12. Either of these arrangements used individually or both arrangements used together are in accordance with the general exemplary arrangement depicted in FIG. 13, adapted from U.S. patent application Ser. No. 12/418,605.

Further details of HDTP concepts and implementation examples for delimiters and symbols that are responsive, for example, to touch by the human hand is provided in at least the following co-pending patent applications:

U.S. patent application Ser. No. 13/180,512;
U.S. Patent Application 61/506,096;
U.S. Patent Application 61/567,626;
U.S. Patent Application 61/522,239;
U.S. patent application Ser. No. 13/093,834;
U.S. patent application Ser. No. 13/038,365.

It is anticipated that other arrangements for generation of symbols from (corrected, refined, raw, adapted, renormalized, etc.) real-time measured parameters values provided by other portions of a user interface system.

As a very simple yet representative example of symbol generation, assume a particular parameter or rate value, denoted here as "q" is tested (as part of a more complex conditional tests, as stand alone conditional tests, etc.) is tested for three conditions:

CASE 1: $q<Q_a$
CASE 2: $Q_a<q<Q_b$
CASE 3: $q>Q_b$

FIG. 14 depicts such a conditional test for a single parameter or rate value q in terms of a mathematical graph, separating the full range of q into three distinct regions. The region divisions are denoted by the short dashed lines. For the sake of illustration $Q_a$ could be a negative value and $Q_b$ could be a positive value, although this does not need to be the case.

Next, consider example sets of conditional test for two values, either one of which can be a parameter value or rate value. As a simple example, each of the two values can be tested for three conditions in a similar fashion as for the single value example considered above. FIG. 15a depicts such a conditional test for a two values (parameter and/or rate) in terms of a mathematical graph, separating the full range of each of the two values into three regions. The region divisions each of the two values are denoted by the short dashed lines, for the sake of illustration one in a negative range for the value and the other in a positive value, although this does not need to be the case. By extending the short dashed lines to longer lengths as shown in FIG. 15*b*, it can be seen that the region (here a portion of a plane) defined by the full range of the two values is divided into 3×3=9 distinct regions.

Similarly, consider example sets of conditional test for three values, any one of which can be a parameter value or rate value. As a simple example, each of the three values can be tested for three conditions in a similar fashion as for the examples considered above. FIG. 16*a* depicts such a conditional test for a two values (parameter and/or rate) in terms of a mathematical graph, separating the full range of each of the three values into three regions. The region divisions each of the three values are denoted by the short dashed lines, for the sake of illustration one in a negative range for the value and the other in a positive value, although this does not need to be the case. By extending the short dashed lines to longer lengths as shown in FIG. 16*b*, it can be seen that the region (here a portion of 3-space) defined by the full range of the three values is divided into 3×3×3=27 distinct regions.

In a similar way, if there are N variables, each of which are tested for lying within M distinct ranges, the number of distinct regions is given by $M^N$. Thus for six (N=6) parameters (such as for example the six $\{x, y, p, \phi, \theta, \psi\}$ provided for each "blob" in a HDTP system), each of which are tested for lying within distinct ranges (M=3) such as "mid range" and two opposite "far extremes", the number of distinct regions is given by $3^6$=729.

In principle, each the corresponding rate (time-derivative) values for each of the parameters could be split into three ranges as well. A practical distinction among rates from a user's viewpoint might be separate recognition of a "zero or slow" and "anything fast" rate (M=2). Such a conditional test could utilize an absolute value function in the conditional test. Note that a two-value test on an absolute value is equivalent to a three range test wherein the two extreme ranges produce the same outcome. Note the number of distinct regions for the set of six rate values (N=6), each separately tested for occupancy in two ranges ("zero or slow" and "anything fast", so M=2) is $2^6$=64.

For an example implementation combining these two aforedescribed examples, the total number of distinction recognizable regions is 729×64=46,656. In principal a distinct symbol could be assigned to each of these regions, noting that each region is equivalent to a 12-variable (six parameter values plus rate-of-change value for each, giving 12) conditional test outcome. This provides a very rich environment from which to draw for design choices of ergonomics, metaphors, omitted conditions/regions that are not useful or applicable, imposed contextual interpretations, etc.

It is to be understood that the above is merely a chain of examples and not to be in any way considered limiting.

5.1 Discrete (Symbol) and Continuous Parameters (Adapted from Ser. No. 12/418,605)

The HDTP provides for the production of the following six parameter values from a single blob associated with the hand or other pliable object:

Calculation of downward pressure and two planar centers of contact area;

Calculation of roll, pitch, and yaw angles of contact area.

In some embodiments, these parameter values may take on a wider range (i.e., more than 3 and typically far greater than 2) of numerical values within a consecutive range—in that they are range of numerical values possible, the values taken on by these six parameters will be informally referred to as "continuous" (in contrast to a smaller set of binary values, or a set of non-consecutive "symbols").

These parameter values may be numerically differentiated in time (for example, by simply taking the difference between values of the current and previous scan) to produce rate measurements for the parameters, such as velocity and (by numerically differentiating velocity) acceleration. These result in additional "continuous" rate values.

One or more parameter values and/or rate values may be individually, in combination, or within a numerical computation, submitted to one or more threshold tests. The outcomes of the threshold tests may be regarded as symbols (for example, what region of the sensor array is the center of contact in, has a roll angle velocity or acceleration exceeded a specified value, etc.).

Additionally, aforementioned shape recognition functions may also generate symbols. The invention provides for one or both of the threshold and shape recognition elements to generate more than one symbol at a time (for example, several conditions may be satisfied at the same moment).

5.2 Delimiters, Sampling (Adapted from Ser. No. 12/418, 605)

Figure 17:
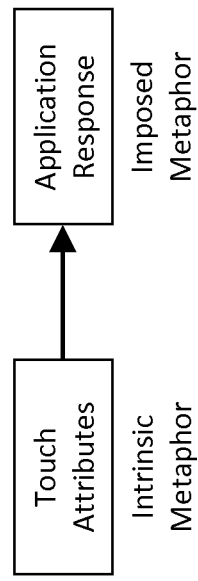
FIG. 17 a representation of an intrinsic metaphor applied to a touch sensor that senses touch attributes, and these being directed to an imposed metaphor causing an application response to be invoked on an associated application.

The invention affords and provides for yet further capabilities. For example, FIG. 17 shows an intrinsic metaphor applied to a touch sensor that senses touch attributes, and these being directed to an imposed metaphor causing an application response to be invoked on an associated application.

Figure 18:
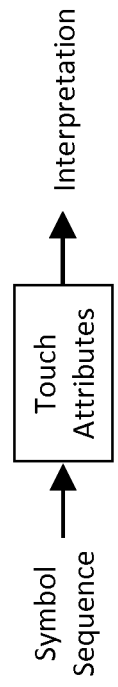
FIG. 18 depicts a representation of a sequence of symbols can be directed to a state machine so as to produce other symbols that serve as interpretations of one or more possible symbol sequences.
Figure 19:
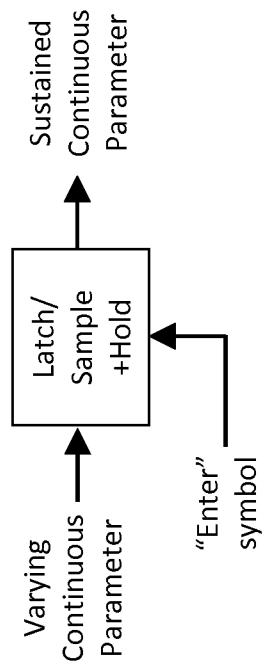
FIG. 19 depicts a representation of a variation on FIG. 18 wherein one or more symbols may be designated the meaning of an "Enter" key, permitting for sampling one or more varying parameter, rate, and/or symbol values and holding the value(s) until, for example, another "Enter" event, thus producing sustained values.

As another example, a sequence of symbols can be directed to a state machine, as shown in FIG. 18, to produce other symbols that serve as interpretations of one or more possible symbol sequences. In an embodiment, one or more symbols may be designated the meaning of an "Enter" key, permitting for sampling one or more varying parameter, rate, and/or symbol values and holding the value(s) until, for example, another "Enter" event, thus producing sustained values as illustrated in FIG. 19.

Figure 13:
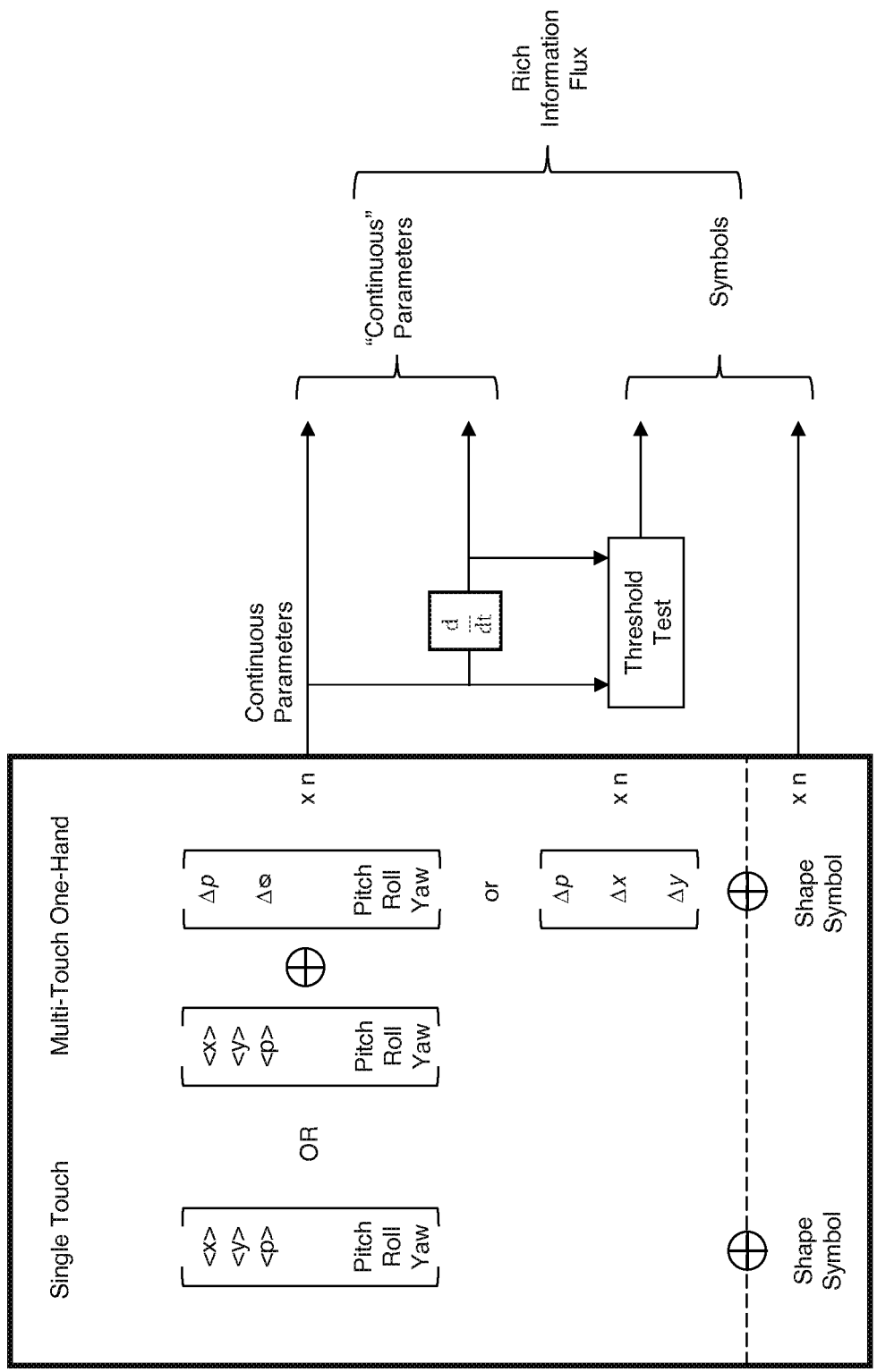
FIG. 13, adapted from U.S. patent application Ser. No. 12/418,605, depicts a representation of an example symbol generation arrangement.

In an embodiment, the symbols produced by arrangements such as that of FIG. 13 include symbols that are responsive to rate values. In some embodiments, these rate-responsive symbols can directly serve as recognitions or signifiers of simple gestures, for example a "finger flick" in a suitably limited gesture lexicon.

5.3 Support for Discrete Grammars (Adapted from Ser. No. 12/418,605)

FIG. 13, introduced earlier, illustrates an exemplary embodiment of these approaches. This demonstrates that simple contact with (or other operative stimulus of) the sensor array can produce a rich information flux of parameter, rate, and symbol values.

Figure 20:
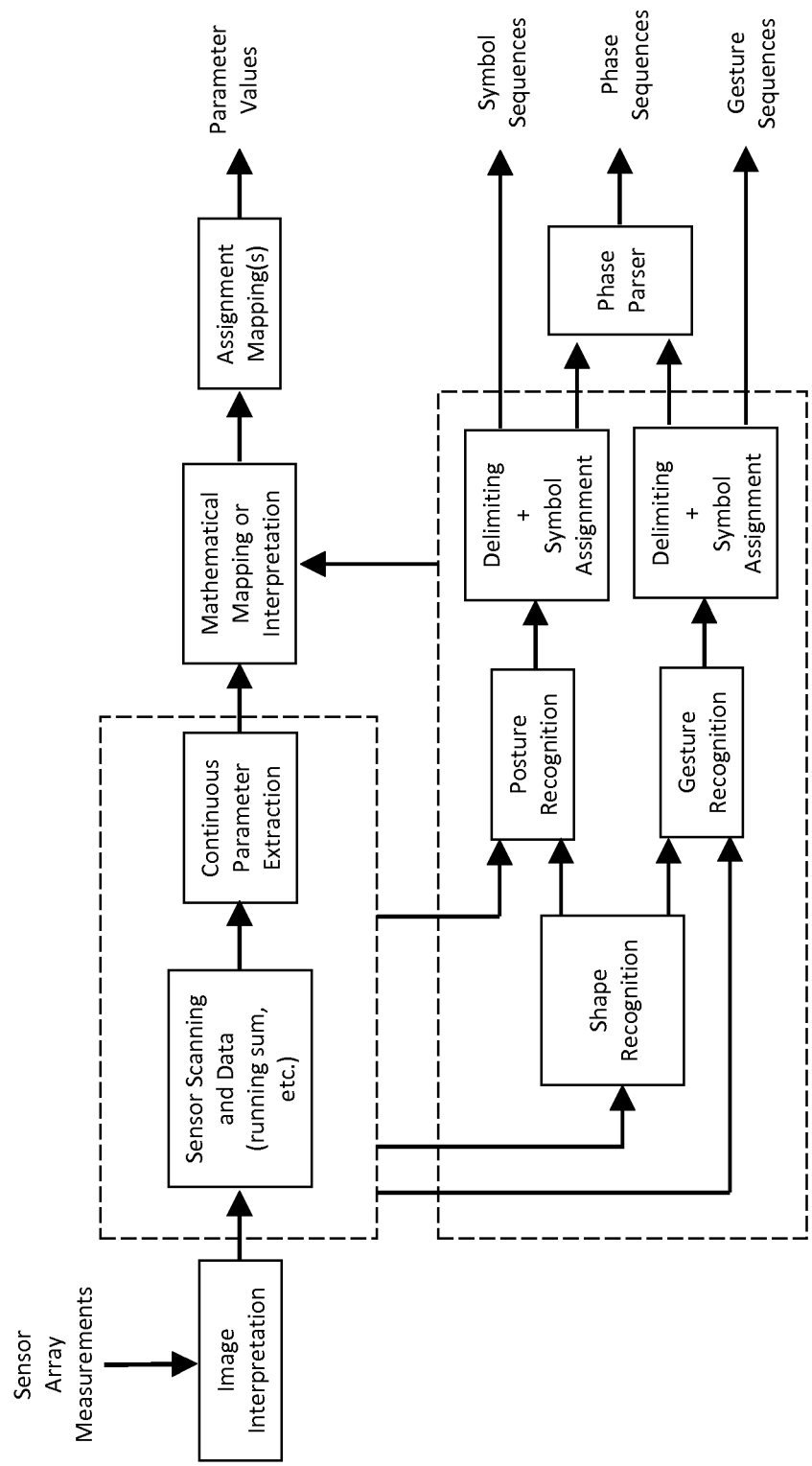
FIG. 20 depicts a representation of further processing opportunities supporting a full range of postures, gestures, real-time parameter extractions, and information needed for implementations of gesture grammars.

Together with the rich metaphors available with the touch interface, a tremendous range of synergistic user interface opportunities are provided by the present invention. Further processing opportunities supporting a full range of postures, gestures, real-time parameter extractions, and information needed for implementations of gesture grammars is depicted within a portion of FIG. 20.

5.4 Support for Continuous-Grammar (Adapted from Ser. No. 12/418,605)

As an additional syntactic aspect, specific hand postures and/or gestures may mapped to specific selected assignments of control signals in ways affiliated with specific purposes. For example, finger ends may be used for one collection of . . . parameters, thumb for a second potentially partially overlapping collection of . . . parameters, flat fingers for a third partially-overlapping collection, wrist for a fourth, and cusp for a fifth, and fist for a sixth. In this case it may be natural to move the hand through certain connected sequences of motions; for example: little finger end, still in contact, dropping to flat-finger contact, then dropping to either palm directly or first to cusp and then to palm, then moving to wrist, all never breaking contact with the touch-pad. Such permissible sequences of postures that can be executed sequentially without breaking contact with the touch-pad will be termed "continuous grammars."

To support the handling of continuous grammars, it is useful to set up parameter assignments, and potentially associated context-sensitive parameter renormalizations, that work in the context of selected (or all available) continuous grammars. For example, as the hand contact evolves as being recognized as one posture and then another, parameters may be smoothly handed-over in interpretation from one posture to another without abrupt changes, while abandoned parameters either hold their last value to return to a default value (instantly or via a controlled transient.

5.5 Context (Adapted from Ser. No. 12/418,605)

In an embodiment, one or more symbols may be designated as setting a context for interpretation or operation and thus control mapping and/or assignment operations on parameter, rate, and/or symbol values as shown in FIG. 21.

The operations associated with FIG. 18, FIG. 19, and FIG. 21 can be combined to provide yet other capabilities. For example, the exemplary arrangement of FIG. 22 shows mapping and/or assignment operations that feed an interpretation state machine which in turn controls mapping and/or assignment operations. In implementations where context is involved, such as in arrangements such as those depicted in FIG. 18, FIG. 19, FIG. 21 and FIG. 22, the invention provides for both context-oriented and context-free production of parameter, rate, and symbol values. The parallel production of context-oriented and context-free values may be useful to drive multiple applications simultaneously, for data recording, diagnostics, user feedback, and a wide range of other uses.

5.6 Gesture Compositions and Deconstructions with Respect to Primitive Elements in Measured Signal Space Among the gesture linguistic concepts taught U.S. patent application Ser. No. 12/418,605 is that a sequence of symbols can be directed to a state machine to produce other symbols that serve as interpretations of one or more possible symbol sequences. This provides one embodiment of an approach wherein (higher-level) gestures are constructed from primitive elements, in this case, other (lower-level) gestures. In such an arrangement, a predefined gesture can comprise a specific sequence of plurality of other gestures. For example FIG. 23 depicts an example representation of a predefined gesture comprised by a specific sequence of three other gestures. Similarly, a predefined gesture comprised by a specific sequence of two other gestures, or a predefined gesture comprised by a specific sequence of four or more other gestures.

In an embodiment, a specific predefined gesture is comprised by a particular predefined sequence of gestemes. FIG. 24 depicts an example representation of a predefined gesture comprised by a sequence of five recognized gestemes. Similarly, a predefined gesture comprised by a specific sequence of two, three, or four gestemes, or a predefined gesture comprised by a specific sequence of six or more other gestemes. Additionally, in some arrangements a predefined gesture can be comprised by a single gesteme.

In an embodiment, a recognized gesteme is comprised of a symbol produced by one or more threshold test(s) applied to one or more measured or calculated value(s) responsive to a user interface sensor.

In an embodiment, a recognized gesteme is comprised of a sequence of symbols produced by one or more threshold test(s) applied to one or more measured or calculated value(s) responsive to a user interface sensor.

In an embodiment, a recognized gesteme is comprised of a symbol produced by a state machine, the state machine responsive to a sequence of symbols produced by one or more threshold test(s) applied to one or more measured or calculated value(s) responsive to a user interface sensor.

In an embodiment, a recognized gesteme is determined by the outcome of a vector quantizer applied to one or more measured or calculated value(s) responsive to a user interface sensor.

In an embodiment, a recognized gesteme is determined by the outcome of a matched filter applied to one or more measured or calculated value(s) responsive to a user interface sensor.

5.7 Example HDTP Parameters that can be Generated by Ergonomically-Viable Single-Hand Compound Postures (Adapted from Ser. No. 12/418,605)

There are many ways to organize the possible degrees of freedom generated by ergonomically-viable single-hand compound postures. One exemplary organization is to first consider the overall orientation attributes of the entire compound posture, and then consider the finger-by-finger variations that are possible with respect to it. This approach has several variations, a few of which are presented here.

The overall orientation attributes of the entire compound posture may include one or more of the following:
  Overall Positions/Displacements of the Compound Posture:
    left-right position or translation;
    forward-back position or translation;
    more-less downward displacement or translation (pressure);
  Overall Angles/Rotations of the Compound Posture:
    pivoting rotation (yaw);
    left-right tilt (roll);
    forward-back tilt (pitch).

These overall compound posture parameters may be obtained by various means, some of which as discussed above. These include selecting parameters individually calculated for a representative finger or non-finger region, averaging individually calculated parameters, and/or merging at least some running sums at the data acquisition stage.

The finger-by-finger differential variations that are possible with respect to the overall orientation attributes of an entire compound posture (including ones that involve most or all of the fingers lying flat) may include one or more of the following:
  separation angle of adjacent fingers;
  difference in downward pressure.

This approach gives up to two extra parameters for each added finger. In a more sophisticated approach for arched finger postures, the finger-by-finger differential variations that are possible with respect to the overall orientation attributes of the entire compound posture may include one or more of the following:
  difference in left-right position;
  difference in forward-back position;
  difference in downward pressure This approach gives up to three extra parameters for each added finger. Thus, most generally, for a single-hand compound posture employing N of the five fingers of the hand, the maximum number of independent parameters that can be independently controlled at the same time is in the range of $6+2(N-1)$ to $6+3(N-1)$. For five fingers, this gives a maximum of fourteen parameters to as many as eighteen parameters for an arched single-hand posture. The number of parameters can be yet further expanded by including the palm and the wrist.

The invention provides for the expansion of the single blob version of FIG. 13 so as to provide parameter calculations for the cases of multiple independent individual blobs and/or compound image blobs. The top portion of FIG. 13 depicts an example embodiment wherein sensor data can be interpreted as one blob, two or more individual blobs, or as a compound posture. These may be calculated in parallel and/or selectively, and in selective modes the selection may be controlled by the application using a control arrangement like that of FIG. 21 or by semantic feedback using a control arrangement similar to FIG. 22.

5.8 Layered and Multiple-Channel Posture-Level Metaphors

The invention provides for various types of layered and multiple-channel metaphors. Layered metaphors at higher semantic and grammatical levels will be considered later. FIG. 25 depicts a representation of a layered and multiple-channel metaphor wherein the {x,y} location coordinates represent the location of a first point in a first geometric plane, and the {roll,pitch} angle coordinates are viewed as determining a second independently adjusted point on a second geometric plane. In various versions of such metaphors, one or more of the following can be included:

the first and second planes can be viewed as being superimposed (or alternatively, entirely independent)

The yaw angle can be viewed as affecting the angle of rotation of one plane with respect to another (or alternatively, entirely independent)

The pressure exerted or associated displacement can be viewed as affecting the separation distance between the planes (or alternatively, entirely independent).

5.9 Compound Parameter, Rate, and Symbol Production (Adapted from Ser. No. 12/418,605)

The invention provides for the expansion of the single blob version of FIG. 13 so as to provide shape and posture recognition calculations for the cases of multiple independent individual blobs and/or compound image blobs. The bottom portion of FIG. 13 depicts an example embodiment wherein sensor data can be interpreted as one blob, two or more individual blobs, or as a compound posture. These may be calculated in parallel and/or selectively, and in selective modes the selection may be controlled by the application using a control arrangement like that of FIG. 21 or by semantic feedback using a control arrangement like that of FIG. 22.

6. Support for Affixes and Interrupted Gestures

In spoken and written language, various types of affixes are commonly used. Some of the types of affixes found in linguistic theory of words include:

Suffix: addendum appended to the end of a root word;
Prefix: addendum appended to the beginning of a root word;
Infix: addendum inserted within a root word;
Circumfix: first addendum appended to the beginning of a root word and second associated addendum appended to the end of a root word;
Interfix: addendum inserted between two root words;
Transfix: An affix that incorporates a pause delineating between a root word and addendum or insertions.

The present invention provides support for the structuring, recognition, processing, and interpretation of "gesture affixes", such as:

Gesture suffix: addendum appended to the end of a gesture;
Gesture prefix: addendum appended to the gesture word;
Gesture circumfix: first addendum appended to the beginning of a first gesture and second associated addendum appended to the end of a second gesture;
Gesture interfix: addendum inserted between two gestures;
Gesture transfix: An affix that incorporates a pause delineating between a gesture and addendum or insertions.

Various implementation approaches can be used, and a number of examples are provided. As one type of approach, one or more gestemes can be used to create the addendums. In various implementations, the addendums can be gestemes that are not recognized as gestures, sequences of gestemes that are not recognized as gestures, gestemes that are not recognized as gestures, sequences of gestemes that are not recognized as gestures, and/or combinations of these.

It is noted that some gesture affixes, such as gesture infixes, involve interruption of the execution of a gesture, while other gesture affixes, such as gesture suffixes and gesture prefixes, do not involve interruption of the execution of a gesture. There are also other reasons for supporting the interruption of the execution of a gesture that have no relation to gesture affixes. FIG. 26 depicts a representation of the relations between gesture affixes and interrupted gesture executions. Interrupted gestures can also be more broadly supported by the present invention so as address covering non-affix cases.

6.1 Gesture Suffixes

In the gesteme implementation of gestures, a first gesture $G^A$ comprises a first sequence of m gestemes $\{g_1^A, \ldots, g_m^A\}$. Upon completion of the execution of the first gesture by the user, a second gesteme $g_1^B$ or sequence of n gestemes $\{g_1^B, \ldots, g_n^B\}$ will be executed. Upon the completion of the execution of the second gesteme or sequence of gestemes, the execution of the remaining unexecuted gesteme(s), the first gesture will be recognized as having a gesture suffix.

In some implementations, only a single gesteme is permitted as a suffix. In other implementations, only a specific gesteme or sequence of gestemes is permitted as a suffix. In yet other implementations, only a specific gesteme or sequence of gestemes is permitted as a suffix. In yet other implementations, a wider range of gestemes or sequence of gestemes is/are permitted as a suffix.

More explicitly, this includes the following cases for the composite sequence of gestemes:

$\{g_1^A, g_1^B\}$ where m=1 and n=1;
$\{g_1^A, g_1^B, \ldots, g_n^B\}$ where m=1 and n>1;
$\{g_1^A, \ldots, g_m^A, g_1^B\}$ wherein m>1 and n=1;
$\{g_1^A, \ldots, g_m^A, g_1^B, \ldots, g_n^B\}$ where m>1,and n>1;

Note that cases with m=1 are those wherein the first gesture comprises exactly one gesteme, and cases with n=1 are those wherein the suffix comprises exactly one gesteme.

In an embodiment, the existence of any of the above-listed interruption cases is used to convey semantic content.

In an embodiment, the point of the interruption within the trajectory of the first gesture is used to convey semantic content.

In an embodiment, the point of the interruption within the gesteme sequence of the first gesture is used to convey semantic content.

Alternatively, semantic pattern recognition or other approaches can be used.

6.2 Gesture Prefixes

In the gesteme implementation of gestures, a first gesture $G^A$ comprises a first sequence of m gestemes $\{g_1^A, \ldots, g_m^A\}$.

Prior to the execution of the first gesture by the user, a second gesteme $g_1^B$ or sequence of n gestemes $\{g_1^B, \ldots, g_n^B\}$ will be executed. Upon the completion of the execution of the first gesture, the first gesture will be recognized as having a gesture prefix.

In some implementations, only a single gesteme is permitted as a prefix. In other implementations, only a specific gesteme or sequence of gestemes is permitted as a prefix. In yet other implementations, only a specific gesteme or sequence of gestemes is permitted as a prefix. In yet other implementations, a wider range of gestemes or sequence of gestemes is/are permitted as a gesture prefix.

More explicitly, this includes the following cases for the composite sequence of gestemes:

$\{g_1^B, g_1^A\}$ where m=1 and n=1;
$\{g_1^B, g_1^A, \ldots, g_m^A\}$ where m>1 and n=1;
$\{g_1^B, \ldots, g_n^B, g_1^A\}$ wherein m=1 and n>1;
$\{g_1^B, \ldots g_n^B, g_1^A, \ldots, g_m^A\}$ where m>1, and n>1;

Note that cases with m=1 are those wherein the first gesture comprises exactly one gesteme, and cases with n=1 are those wherein the prefix comprises exactly one gesteme.

In an embodiment, the existence of any of the above-listed interruption cases is used to convey semantic content.

In an embodiment, the point of the interruption within the trajectory of the first gesture is used to convey semantic content.

In an embodiment, the point of the interruption within the gesteme sequence of the first gesture is used to convey semantic content.

Alternatively, semantic pattern recognition or other approaches can be used.

6.3 Gesture Affixes realized via Interruption of the Execution of a First Predefined Gesture with the Execution of At Least One Gesteme The execution of a gesture can be interrupted by the user executing it. The executed gesture can be resumed or not resumed (i.e., abandoned).

In an embodiment, a partially-executed gesture can be recognized as such and information regarding the partially-executed gesture (as measured and/or subsequently-interpreted) is stored. In an embodiment, should the partially-executed gesture be resumed, the stored information regarding the partially-executed gesture is used in the recognition of the completed form of the previously partially-executed gesture. In an embodiment, should the partially-executed gesture not be resumed, the stored information regarding the partially-executed gesture is deleted. In an embodiment, should the partially-executed gesture not be resumed within a pre-determined length of time, the stored information regarding the partially-executed gesture is deleted.

With this established, this section considers the case wherein the execution of a first predefined gesture is interrupted, one or more gestemes that is/are not collectively recognized as gesture are then executed, and the execution of the first predefined gesture is resumed and completed. If the additional gesteme(s) thus "inserted" during the interruption is/are used linguistically as an affix to the first gesture, the latter case amounts to the "infix" case of an "affix" in the context of gesture grammars.

The case wherein the execution of a first predefined gesture is interrupted, one or more second gesture(s) is/are then fully executed, and the execution of the first gesture is resumed and completed is addressed in co-pending U.S. patent application Ser. No. 13/414,600. Those teachings are selectively used below as cited.

In an aspect of the invention, the additional gesteme(s) thus "inserted" during the interruption is/are used in the context of a gesture grammar as an affix to the first gesture as an "infix."

Figure 27C:
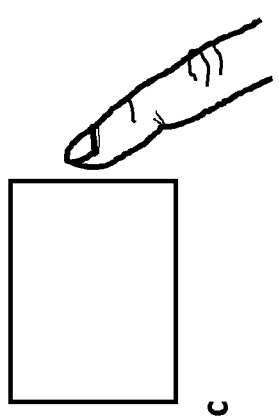
FIG. 27a through FIG. 27j depict an example representation of the execution of a first example predefined gesture that is begun (FIG. 27a) and interrupted (FIG. 27b and FIG. 27c), the full execution of an example second predefined gesture (FIG. 27d, FIG. 27e, FIG. 27f, and FIG. 27g), and the resumed and completed execution of the first predefined gesture (FIG. 27h, FIG. 27i, and FIG. 27j).
Figure 27G:
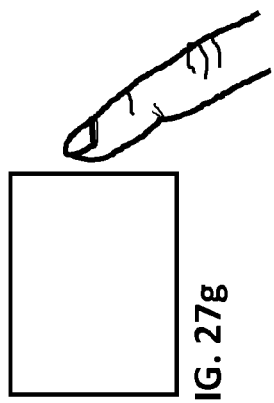
Figure 27J:
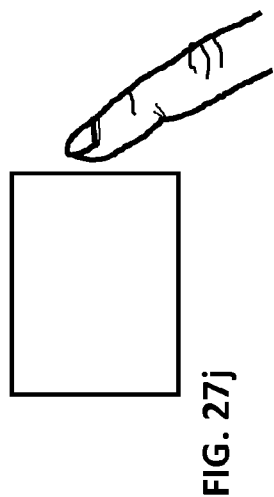
Figure 27B:
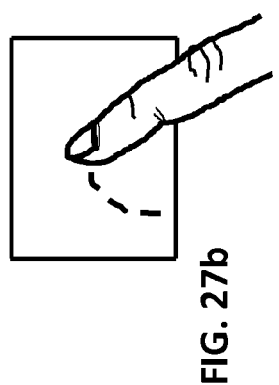
Figure 27F:
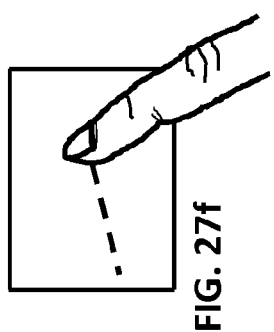
Figure 27I:
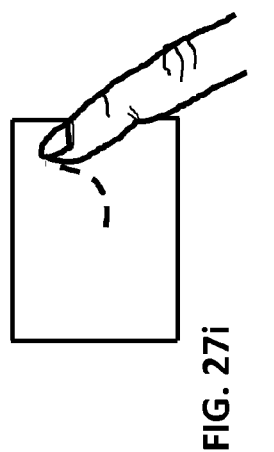
Figure 27A:
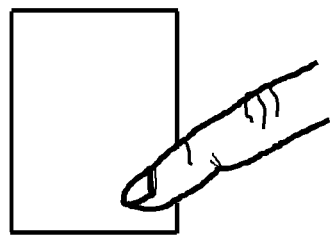
Figure 27E:
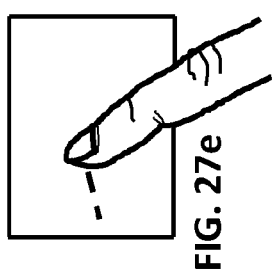
Figure 27H:
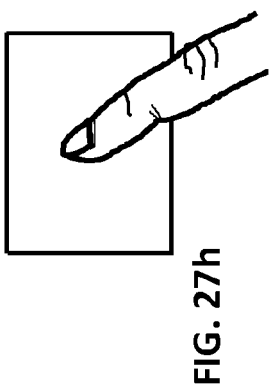
Figure 27D:
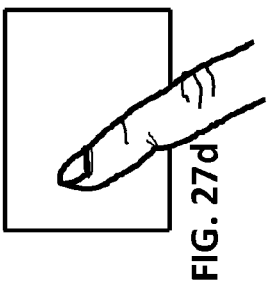

As an example, FIG. 27a through FIG. 27j depict an example representation of the execution of a first example predefined gesture that is begun (FIG. 27a) and interrupted (FIG. 27b and FIG. 27c), the full execution of an example second predefined gesture (FIG. 27d, FIG. 27e, FIG. 27f, and FIG. 27g), and the resumed and completed execution of the first predefined gesture (FIG. 27h, FIG. 27i, and FIG. 27j).

In this example as described thus far, recognition of the interruption of the execution the first gesture is established at least by the lift-off of the finger from the touch surface depicted in FIG. 27c. Recognition of the interruption of the execution the first gesture can also or alternatively require semantic restrictions on gesteme sequences for predefined gestures. In either version (pause version or semantic restriction version) of this variation where the FIG. 27c lift-off is skipped, the second gesture must begin at the same location where the first gesture was interrupted. Note by including the FIG. 27c lift-off, the location of the beginning of the second gesture need not be influenced by the location where the first gesture was interrupted.

Similarly, in an embodiment the lift-off of the finger from the touch surface depicted in FIG. 27g can be used to signify the completion of the second gesture and the prompt for the completion of the first gesture. In a variation of this example, the lift-off of the finger from the touch surface depicted in FIG. 27g can be omitted; instead a pause can be used to signify the completion of the second gesture and the prompt for the completion of the first gesture, or semantic restrictions on gesteme sequences can be used to signify the completion of the second gesture and the prompt for the completion of the first gesture. In either version (pause version or semantic restriction version) of this variation where the FIG. 27g lift-off is skipped, the resumption of the first interrupted gesture must begin at the same location where the second gesture ended. Note by including the FIG. 27g lift-off, the location of the resumption of the first interrupted gesture need not be influenced by the location where the second gesture was completed.

Similarly, in an embodiment the lift-off of the finger from the touch surface depicted in FIG. 27j can be used to signify the completion of the first gesture. In a variation of this example, the lift-off of the finger from the touch surface depicted in FIG. 27j can be omitted; instead a pause can be used to signify the completion of the first gesture, or semantic restrictions on gesteme sequences can be used to signify the completion of the first gesture.

Figure 28D:
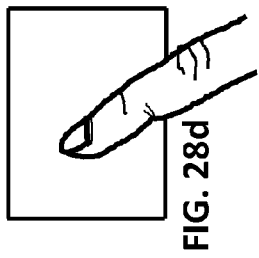
FIG. 28a through FIG. 28j depict a variation on the example of FIG. 27a through FIG. 27j wherein the lift-off events depicted by FIG. 27c, FIG. 27g, and FIG. 27j are replaced with the pause events depicted in FIG. 28c with FIG. 28d, FIG. 28g with FIG. 28h, and in FIG. 28j.
Figure 28H:
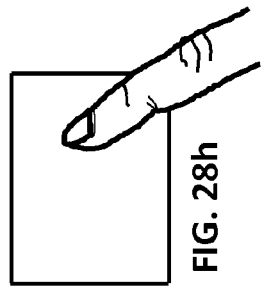
Figure 28C:
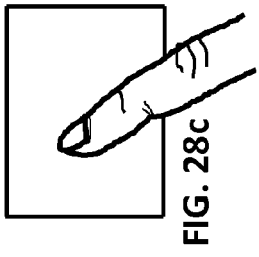
Figure 28G:
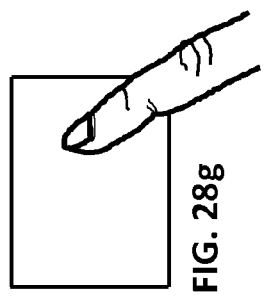
Figure 28B:
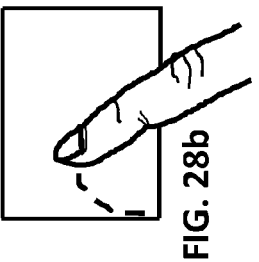
Figure 28F:
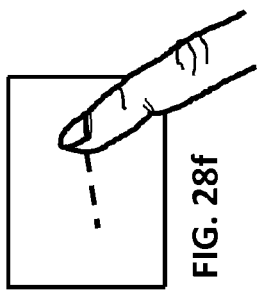
Figure 28J:
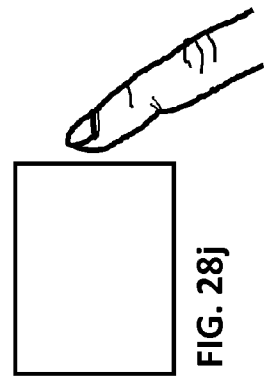
Figure 28A:
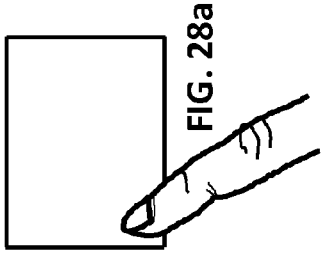
Figure 28E:
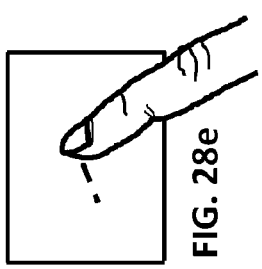
Figure 28I:
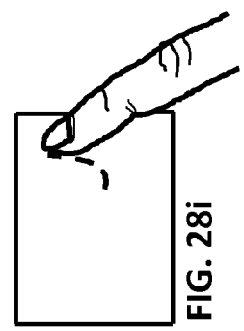

As a second example, FIG. 28a through FIG. 28j depict a variation on the example of FIG. 27a through FIG. 27j wherein the lift-off events depicted by FIG. 27c, FIG. 27g, and FIG. 27j are replaced with the pause events depicted in FIG. 28c with FIG. 28d, FIG. 28g with FIG. 28h, and in FIG. 28j. Such pause events can be recognized by conditions wherein the magnitude of the rate-of-change of one or more measured values or the magnitude of the rate-of-change of one or more values calculated from one or more measured values fall below associated reference threshold(s). In another variation of this example, the lift-off of the finger from the touch surface depicted in FIG. 28j is not used; instead semantic restrictions on gesteme sequences can be used to signify the completion of the second gesture and the prompt for the completion of the first gesture. FIG. 28a is a repeat of FIG. 27a. FIG. 28b is a repeat of FIG. 27b. FIG. 28e is a repeat of FIG. 27e. FIG. 28f is a repeat of FIG. 27f. FIG. 28i is a repeat of FIG. 27i.

As a third example, FIG. 29a through FIG. 29f depict a variation on the example of FIG. 27a through FIG. 27j wherein the lift-off events associated FIG. 27c, FIG. 27g, and FIG. 27j are omitted altogether and semantic restrictions on gesteme sequences can be used to signify the completion of the second gesture and the prompt for the completion of the first gesture. For this example, the second gesture must begin at the same location where the first gesture was interrupted, and the resumption of the first interrupted gesture must begin at the same location where the second gesture ended.

In an embodiment, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of symbols, each symbol produced by the at least one operation responsive to an associated portion of a user interaction actions made by the user;

Determining from the sequence of symbols that the user's execution a first gesture has been interrupted;

Determining from the sequence of symbols that the user's execution a second gesture has been started and completed before the first gesture has been resumed; and Determining from the sequence of symbols that the user's execution a first gesture has been completed;

wherein the first gesture is recognized and the second gesture is recognized.

As a second example, in the gesteme implementation of gestures, a first gesture $G^A$ comprises a first sequence of m gestemes $\{g_1^A, \ldots, g_m^A\}$. This gesture will, at some point in its execution by the user, be interrupted and a second gesteme $g_1^B$ or sequence of n gestemes $\{g_1^B, \ldots, g_n^B\}$ will be executed. Upon the completion of the execution of the second gesteme or sequence of gestemes, the execution of the remaining unexecuted gesteme(s) of the first gesture is resumed and the execution of the first gesture is then completed. In various implementations, the second gesteme or sequence of gestemes can serve as gesture "infix."

More explicitly, this includes the following cases for the composite sequence of gestemes:

$\{g_1^A, g_1^B, \ldots, g_n^B, g_2^A, g_2^A\}$ where m=2 and n>1;
$\{g_1^A, g_1^B, \ldots, g_n^B, g_2^B, \ldots, g_m^A\}$ where m>2 and n>1;
$\{g_1^A, \ldots, g_{m-1}^A, g_1^B, \ldots, g_n^B, g_m^A\}$ wherein m>2 and n>1;
$\{g_1^A, \ldots, g_k^A, g_1^B, \ldots, g_n^B, g_{k+1}^A, \ldots, g_m^A\}$ where m>3, 1<k<(m−1), and n>1;
$\{g_1^A, g_1^B, g_2^A, g_2^A\}$ where m=2 and n=1;
$\{g_1^A, g_1^B, g_2^A, \ldots, g_m^A\}$ where m>2 and n=1;
$\{g_1^A, \ldots, g_{m-1}^A, g_1^B, g_m^A\}$ where m>2 and n=1;
$\{g_1^A, \ldots, g_k^A, g_1^B, g_{k+1}^A, \ldots, g_m^A\}$ where m>3, 1<k<(m−1), and n=1.

Note that cases with n=1 are those wherein the interruption comprises exactly one gesteme. Also note that cases with m=1 are not admissible since the first gesture must be interrupted and resumed, thus requiring the first gesture to comprise a minimum of two gestemes for the first predefined gesture.

Alternatively, semantic pattern recognition or other approaches can be used.

Additionally, it is noted that by reversing the roles of the first and second gestures, the resulting modified arrangement can be used to support gesture circumfixes.

In another embodiment, the existence of any of the above-listed interruption cases is used to convey semantic content.

In an embodiment, the point of the interruption within the trajectory of the first gesture is used to convey semantic content.

In an embodiment, the point of the interruption within the gesteme sequence of the first gesture is used to convey semantic content.

As mentioned above, case wherein the execution of a first predefined gesture is interrupted, one or more second gesture(s) is/are then fully executed, and the execution of the first gesture is resumed and completed is addressed in co-pending U.S. patent application Ser. No. 13/414,600. In the material below, this insertion of a second gesture within the execution of a first gesture gestures case is considered in the context of affixes, and in particular (although not restricted to) infixes.

Additionally, it is noted that by reversing the roles of the first and second gestures, the resulting modified arrangement can be used to support gesture circumfixes.

In the gesteme implementation of gestures, a first gesture $G^A$ comprises a first sequence of m gestemes $\{g_1^A, \ldots, g_m^A\}$ and a second gesture $G^B$ comprises a second sequence of n gestemes $\{g_1^B, \ldots, g_n^B\}$. More explicitly, as with above, this arrangement also includes the following cases for the composite sequence of gestemes:

$\{g_1^A, g_1^B, \ldots, g_n^B, g_2^A, g_2^A\}$ where m=2 and n>1;
$\{g_1^A, g_1^B, \ldots, g_n^B, g_2^A, \ldots, g_m^A\}$ where m>2 and n>1;
$\{g_1^A, \ldots, g_{m-1}^A, g_1^B, \ldots, g_n^B, g_m^A\}$ wherein m>2 and n>1;
$\{g_1^A, \ldots, g_k^A, g_1^B, \ldots, g_n^B, g_{k+1}^A, \ldots, g_m^A\}$ where m>3, 1<k<(m−1), and n>1;
$\{g_1^A, g_1^B, g_2^A, g_2^A\}$ where m=2 and n=1;
$\{g_1^A, g_1^B, g_2^A, \ldots, g_m^A\}$ where m>2 and n=1;
$\{g_1^A, \ldots, g_{m-1}^A, g_1^B, g_m^A\}$ where m>2 and n=1;
$\{g_1^A, \ldots, g_k^A, g_1^B, g_{k+1}^A, \ldots, g_m^A\}$ where m>3, 1<k<(m−1), and n=1.

Note that cases with n=1 are those wherein the second gesture comprises only one gesteme. Also note that cases with m=1 are not admissible since the first gesture must be interrupted and resumed, thus requiring the first gesture to comprise a minimum of two gestemes for the first predefined gesture.

Alternatively, semantic pattern recognition or other approaches can be used.

In an embodiment, both the first gesture and second gesture are recognized.

In an embodiment, the combination of the first gesture and the second gesture is used to convey additional semantic content beyond that of the first gesture and the second gesture in isolation.

In an embodiment, a method is provided for a user interface recognizing the interruption of the execution of a first gesture with the execution of a second gesture, the method comprising:

Receiving measured information from a user interface sensor, the measured information responsive to user interaction actions made by a user;

Applying at least one operation to the measured information to produce a sequence of gestemes, each gesteme produced by the at least one operation responsive to an associated portion of a user interaction actions made by the user;

Determining from the sequence of gestemes that the user's execution a first gesture has been interrupted;

Determining from the sequence of gestemes that the user's execution a second gesture has been started and completed before the first gesture has been resumed; and Determining from the sequence of gestemes that the user's execution a first gesture has been completed;

wherein the first gesture is recognized and the second gesture is recognized.

Additionally, the above aspects of the present invention can be extended to variation of the above wherein the execution of a first predefined gesture is interrupted, a sequence of a plurality of other predefined gestures are then fully executed, and the execution of the first predefined gesture is then resumed and completed. More explicitly, in the gesteme implementation of gestures, this includes the following cases for the composite sequence of gestemes:

$\{g_1^A, g_1^{sequence}, \ldots, g_n^{sequence}, g_2^A, g_2^A\}$ where m=2 and n>1;

$\{g_1^A, g_1^{sequence}, \ldots, g_n^{sequence}, g_2^A, \ldots, g_m^A\}$ where m>2 and n>1;

$\{g_1^A, \ldots, g_{m-1}^A, g_1^{sequence}, \ldots, g_n^{sequence}, g_m^A\}$ wherein m>2 and n>1;

$\{g_1^A, \ldots, g_k^A, g_1^{sequence}, \ldots, g_n^{sequence}, g_{k+1}^A, \ldots, g_m^A\}$ where m>3, 1<k<(m-1), and n>1;

Here, the first gesture $G^A$ comprises a first sequence of m gestemes $\{g_1^A, \ldots, g_m^A\}$ and a sequence of a plurality of other predefined gestures $G^{sequence}$ comprises a second sequence of n gestemes $\{g_1^{sequence}, \ldots, g_n^{sequence}\}$, this second sequence being the concatenation of the gesteme sequences for each gesture in the sequence of other predefined gestures.

Alternatively, semantic pattern recognition or other approaches can be used.

In an embodiment, all of the first gesture and the sequence of other predefined gestures are individually recognized.

In an embodiment, the existence of any of the above-listed interruption cases is not used to convey semantic content.

The invention provides for various additional operations to be provided based on any gesture recognitions, the existence of an interruption in the execution of the first gesture wherein the sequence of other predefined gestures is completed during the interruption, details of the interruption, etc.

In another embodiment, the existence of any of the above-listed interruption cases is used to convey semantic content.

In an embodiment, the point of the interruption within the trajectory of the first gesture is not used to convey semantic content.

In an embodiment, the point of the interruption within the trajectory of the first gesture is used to convey semantic content.

In an embodiment, the point of the interruption within the gesteme sequence of the first gesture is not used to convey semantic content.

In an embodiment, the point of the interruption within the gesteme sequence of the first gesture is used to convey semantic content.

In an embodiment, the combination of the first gesture and the sequence of other predefined gestures is not used to convey additional semantic content beyond that of the first gesture and the second gesture in isolation.

In an embodiment, the combination of the first gesture and the sequence of other predefined gestures is used to convey additional semantic content beyond that of the first gesture and the second gesture in isolation.

In an embodiment, the combination of the first gesture, the sequence of other predefined gestures, and the location of the interruption within the first gesture is used to convey additional semantic content beyond that of the first gesture and the second gesture in isolation.

6.4 Gesture Circumfixes

As defined at the beginning of the section, a gesture circumfix involves a first addendum appended to the beginning of a gesture and second associated addendum appended to the end of the gesture.

In one type of approach, as noted above, by reversing the roles of the first and second gestures in arrangements for the structuring, recognizing, and processing of gesture interfixes, the resulting modified arrangement can be used to support gesture circumfixes.

In one type of approach, arrangements described above for the structuring, recognizing, and processing of gesture prefixes and for the structuring, recognizing, and processing of gesture suffixes can be combined to create an arrangement to support gesture circumfixes Alternatively, the methods described above for gesture suffixes, gesture prefixes, gesture infixes, and/or gesture circumfixes can be readily modified and/or combined so as to structure, recognize, and process gesture circumfixes.

Alternatively, semantic pattern recognition or other approaches can be used. 6.5 Gesture Interfixes As defined at the beginning of the section, a gesture interfix involves an addendum inserted between two gestures.

In an aspect of the invention, the additional gesteme(s) thus "inserted" during the interruption is/are used in the context of a gesture grammar as an affix to the first gesture as a gesture interfix.

The methods described above for gesture suffixes, gesture prefixes, gesture infixes, and/or gesture circumfixes can be readily modified and/or combined so as to structure, recognize, and process gesture interfixes.

Alternatively, semantic pattern recognition or other approaches can be used.

6.6 Gesture Transfixes

As defined at the beginning of the section, a gesture transfix is an affix that incorporates a pause delineating between a gesture and addendum or insertions.

In an aspect of the invention, the additional gesteme(s) thus "inserted" during the interruption is/are used in the context of a gesture grammar as an affix to the first gesture as a gesture transfix.

The methods described above for gesture suffixes, gesture prefixes, gesture infixes, and/or gesture circumfixes can be readily modified and/or combined so as to structure, recognize, and process gesture transfixes.

Alternatively, semantic pattern recognition or other approaches can be used.

7. Fundamentals of Meaning: Morphemes, Lexemes, and Morphology

In traditional linguistics a morpheme is the smallest linguistic unit that has (semantic) meaning. A word or other next-higher-scale linguistic unit may be composed of one or more morphemes compose a word. Two basic categories of morphemes relevant to this project are:

A free morpheme which can function by itself;

A bound morpheme which can function only when combined or associated in some way with a free morpheme (for example the negating prefix "un" in undo and the plural suffix "s").

The field of morphology addresses the structure of morphemes and other typis of linguistic units such as words, affixes, parts of speech (verb, noun, etc., more formally referred to as "lexical category"), intonation/stress/rhythm (in part more formally referred to as "prosody"), meaning invoked or implied by enveloping context, etc. Morphological analysis also includes a typology framework classifying languages according to the ways by which morphemes are used, for example:

Analytic languages that use only isolated (free) morphemes;

Agglutinative ("stuck-together") languages which use bound morphemes;

Fusional languages that use bound morphemes;

Polysynthetic languages that form words from groups of many morphemes (for example the Chukchi word "tə meyŋ ə levtpə γtə rkə n" which is composed of eight individual morphemes t-ə -meyŋ -ə -levt-peγt-ə -rkə n, and more broadly languages allowing for each consonant and vowel to serve as morphemes.

These examples provide important reference models for options in tactile gestures. For example, in the HDTP approach to touch-based user interfaces, a gesture can:

Associate an individual gesteme with an individual morpheme of general or specific use in an application or group of applications;

Associate a group of two or more este gestemes comprised by a gesture with an individual morpheme of general or specific use in an application or group of applications;

Further, a gesture can then be

Analytic (employing only free morphemes);

Agglutinative or Fusional (employing bound morphemes);

Polysynthetic (gestures composed of many morphemes.

The invention provides for these and other lexicon constructions to be used in the design and structuring of gestures, gesture meaning structures, morphemes, gesture lexicon, and gesture grammars.

Figure 30:
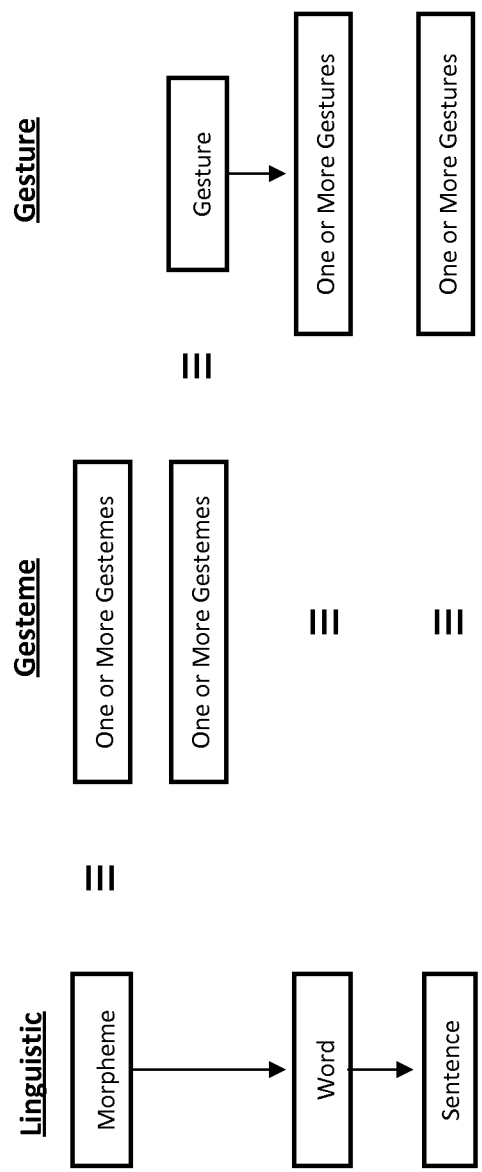
FIG. 30 depicts a representation of some correspondences among gestures, gestemes, and the abstract linguistics concepts of morphemes, words, and sentences.
Figure 31A:
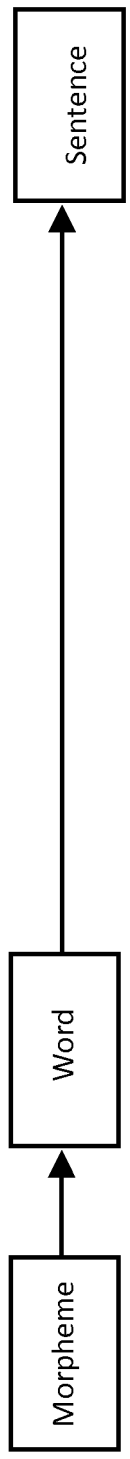
FIG. 31a through FIG. 31d depict representations of finer detail useful in employing additional aspects of traditional linguistics such as noun phrases, verb phrases, and clauses as is useful for grammatical structure, analysis, and semantic interpretation.
Figure 31B:
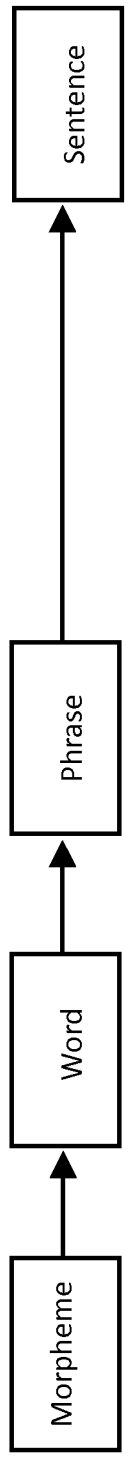
Figure 31C:
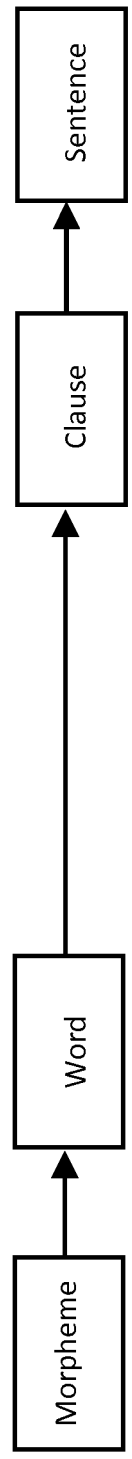
Figure 31D:
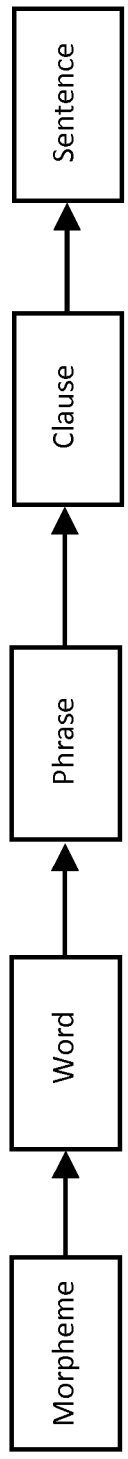
Figure 32B:
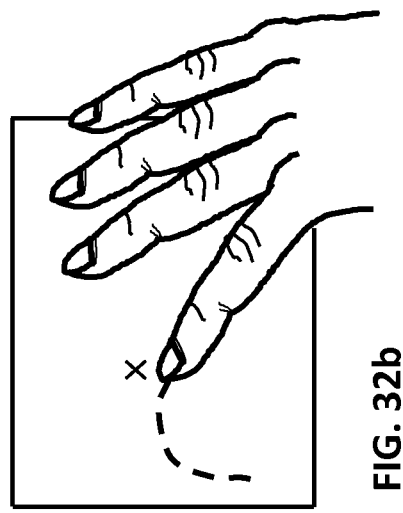
FIG. 32a through FIG. 32d and FIG. 33a through FIG. 33f depict representations of sequentially-layered execution of tactile gestures can be used to keep a context throughout a sequence of gestures.
Figure 32D:
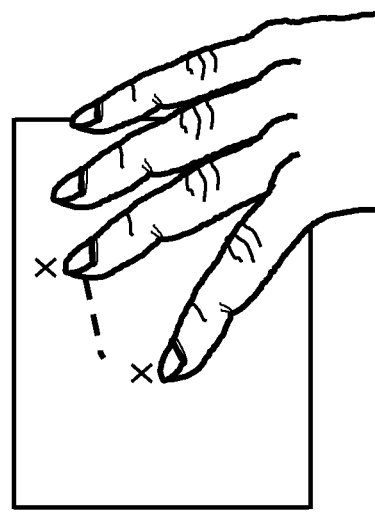
Figure 32A:
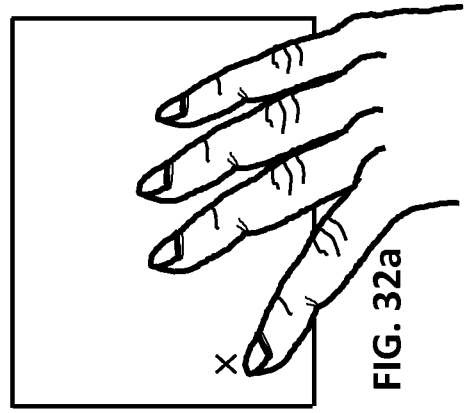
Figure 32C:
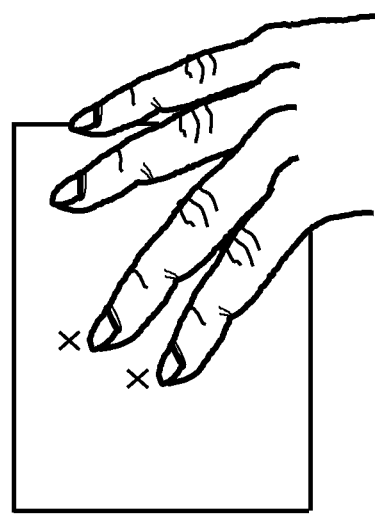
Figure 33A:
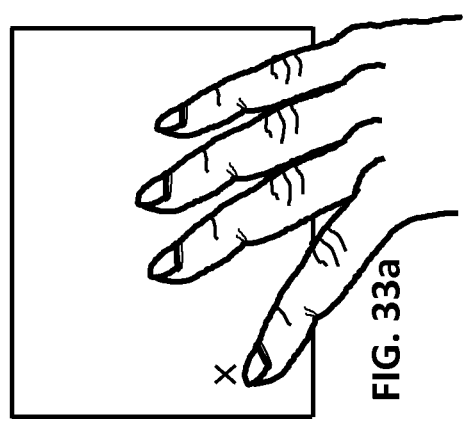
Figure 33B:
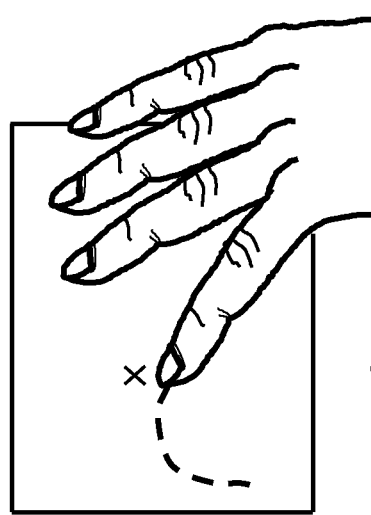
Figure 33C:
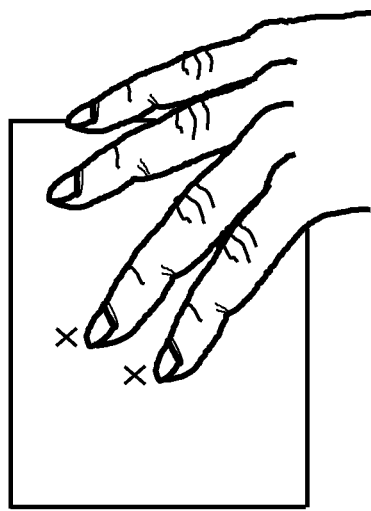
Figure 33D:
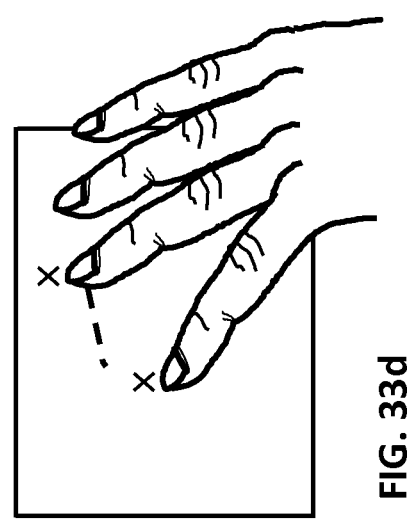
Figure 33E:
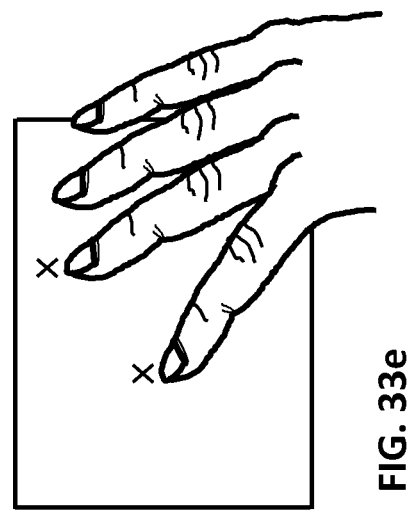
Figure 33F:
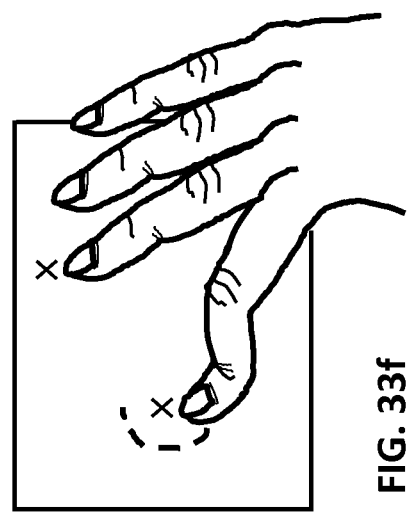

As an example framework for this, FIG. 30 depicts a representation of some correspondences among gestures, gestemes, and the abstract linguistics concepts of morphemes, words, and sentences.

As an additional example framework for this, FIG. 31*a* through FIG. 31*d* provide finer detail useful in employing additional aspects of traditional linguistics such as noun phrases, verb phrases, and clauses as is useful for grammatical structure, analysis, and semantic interpretation.

It is important to note that the HDTP approach to touch-based user interfaces permits a very wide range of formulations such as those suggested above and by other aspects of traditional linguistics. That stated, it is equally if not more important to note that the HDTP approach to touch-based user interfaces does not require inheriting the unnecessary 'baggage' of established written or spoken languages (such as tense matching, noun gender, etc.). Further as to this, typically even the most diverse, robust, and flexible touch-based user interface will be used for a range of command/ inquiry functions that are far more limited in scope, nuance, aesthetics, poetics, and so forth than the language of literature, poetry, persuasive discourse, and the like. Thus, in mining what traditional linguistics has to offer, the balance goal depicted in FIG. 2 is well to be kept in mind.

7.1 Gestural Metaphor, Gestural Onomatopoeia, and Tactile Gesture Logography

The HDTP approach to touch-based user interfaces provides for the structured use of various metaphors in the construction of gestures, strings of gestures, and gestemes. For example, the scope of the metaphor can include:

The entire gesture, string of gestures, or gesteme;

One or more components of a gesture, string of gestures, or gesteme;

One or more aspects of a gesture, string of gestures, or gesteme.

Additionally, the directness (or degree) of the metaphor can cover a range such as:

Imitative onomatopoeia;

Close analogy;

Indirect analogy;

Analogy of abstractions;

Total abstraction.

In traditional linguistics, a logogram is a written character which represents a word or morpheme. Typically a very large number of logograms are needed to form a general-purpose written language. A great interval of time is required to learn the very large number of logograms. Both these provide a major disadvantage of the logographic systems over alphabetic systems, but there can be high reading efficiency with logographic writing systems for those who have learned it. The main logographic system in use today is that of Chinese characters. Logographic systems (including written Chinese) include various structural and metaphorical elements to aid in associating meaning with a given written character within the system.

The HDTP approach to touch-based user interfaces includes provisions for the gestural equivalent of logograms and logographic systems.

7.2 Appropriate Scope of Gesture Lexicon

The lexicon of a language is comprises its vocabulary. In formal linguistics, lexicon is viewed as a full inventory of the lexemes of the language, where a lexeme is an abstract morphological unit that roughly corresponds to a set of forms taken by a word (for example "run," "runs," "ran," and "running" are separate distinguished forms of the same lexeme).

In creating a tactile gesture lexicon, it is likely that the number of lexeme forms can be forced to be one, or else extremely few. Again, typically even the most diverse, robust, and flexible touch-based user interface will be used for a range of command/inquiry functions that are far more limited in scope, nuance, aesthetics, poetics, and so forth than the language of literature, poetry, persuasive discourse, and the like.

7.3 Compound Gestures

Like compound words and word groups that function as a word, the HDTP approach to touch-based user interfaces provides for individual tactile gestures to be merged by various means to create a new gesture. Examples of such various means of merger include:

"Temporally compound" wherein a sequence of two or more tactile gestures is taken as a composite gesture;

"Spatially compound" wherein two or more spatially separated tactile gestures executed at essentially the same time or overlapping in time is taken as a composite gesture;

"Sequential layering" composition (to be discussed);

Geusture forms of portmanteaus wherein two or more gestures or (gesture-defined morphemes) are combined;

Combinations of the two or more instances of one or more of the above.

Additionally, the HDTP approach to touch-based user interfaces provides for the use of a systematic system of shortening a string of two or more gestures, for example as in contractions such as "don't," "it's," etc.

These tactile examples are not limiting, and the examples and concepts can be used in other types of user interface systems and other types of gestures.

7.4 Sequentially-Layered Execution of Gestures

The sequentially-layered execution of tactile gestures can be used to keep a context throughout a sequence of gestures. Some examples sequentially-layered execution of tactile gestures include:

Finger 1 performs one or more gestures and stays in place when completed, then Finger 2 performs one or more gestures, then end;

Finger 1 performs gesture & stays in place when completed, then Finger 2 performs one or more gestures and stays in place when completed, then Finger 1 performs one or more gestures, . . . , then end;

Finger 1 performs gesture & stays in place when completed, then Finger 2 performs one or more gestures and stays in place when completed, then Finger 1 performs one or more gestures and stays in place when completed, then Finger 3 performs one or more gestures, . . . , then end.

Finger 1 performs gesture & stays in place when completed, then Finger 2 performs one or more gestures and stays in place when completed, then Finger 3 performs one or more gestures, . . . , then end.

Rough representative depictions of the first two examples are provided respectively as the series FIG. 32a through FIG. 32d and the series FIG. 33a through FIG. 33f.

These tactile examples are not limiting, and the examples and concepts can be used in other types of user interface systems and other types of gestures.

7.5 Embedded Layering Via Intra-Gestural Prosody Tags

Earlier the notion of "intra-gestural prosody" was introduced through which additional content can be imposed by means of aspects of how a tactile gesture is rendered or executed. For example:

At least one contact angle (yaw, roll, pitch) of the finger(s) used to render each of the one or more individual strokes ("gestemes") making up a tactile gesture;

How many fingers used to render each of the one or more individual strokes ("gestemes") making up a tactile gesture;

Embellishment in individual component element rendering (angle of rendering, initiating curve, terminating curve, intra-rendering curve, rates of rendering aspects, etc.);

Variations in the relative location of individual gesteme rendering;

What part(s) of the finger or hand used to render each gesteme of the tactile gesture;

Changes in one or more of the above over time.

Intra-gestural prosody can be used as a "tag" to create additional associations among gestures.

In one use of this, such intra-gestural prosody can be used to create paths and/or layers of paths. Such paths and layering allows the introduction of additional material for providing a parallel information path, associations, or modifiers.

An example of the use of intra-gestural prosody to render an association is to use a common but distinguishing intra-gestural prosody—for example a finger contact angle, or number of fingers—in the rending of two or more tactile gestures that are to be associated. Another example of the use of intra-gestural prosody to render an association is to use a finger angle, part of the finger (tip, joint, flat) or number of fingers as a signifier for a particular list item (first items, second item, etc), a particular visual object or range of screen (to the left of the gesture rendering area or cursor, to the right, above, below, 45-degree below, nearby, midrange, far, etc.), a particular element from an option list (cut, paste, copy, rotate, etc.), and/or other such approach.

A simple example of the use of intra-gestural prosody to render a modifier is the rate of change to be used to convey the relative extent of the action represented by the tactile gesture ("verb")—for example how fast and fast to scroll through a list—or the relative extent of the subject/object ("noun")—for example how much of the list, text passage, screen region, etc.

8. Phrases, Grammars, and Sentence/Queries

Figure 34:
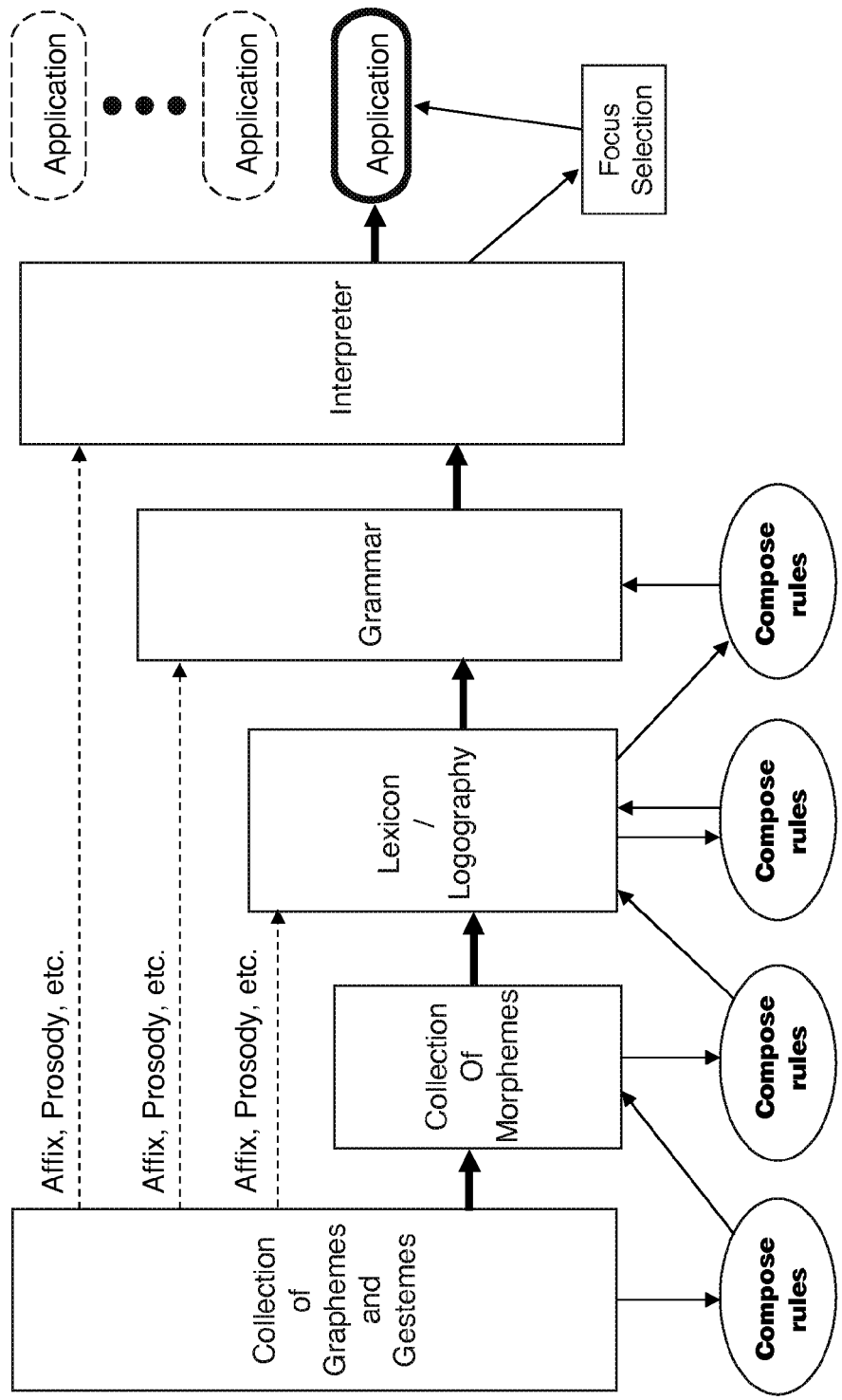
FIG. 34 depicts a representation of an example syntactic and/or semantic hierarchy integrating the concepts developed thus far.

Thus far attention has been largely afforded to the ways individual tactile gestures can be executed, the content and meaning that can be assigned to them, and organizations that can be imposed or used on these. FIG. 34 depicts an example syntactic and/or semantic hierarchy integrating the concepts developed thus far.

Figure 35:
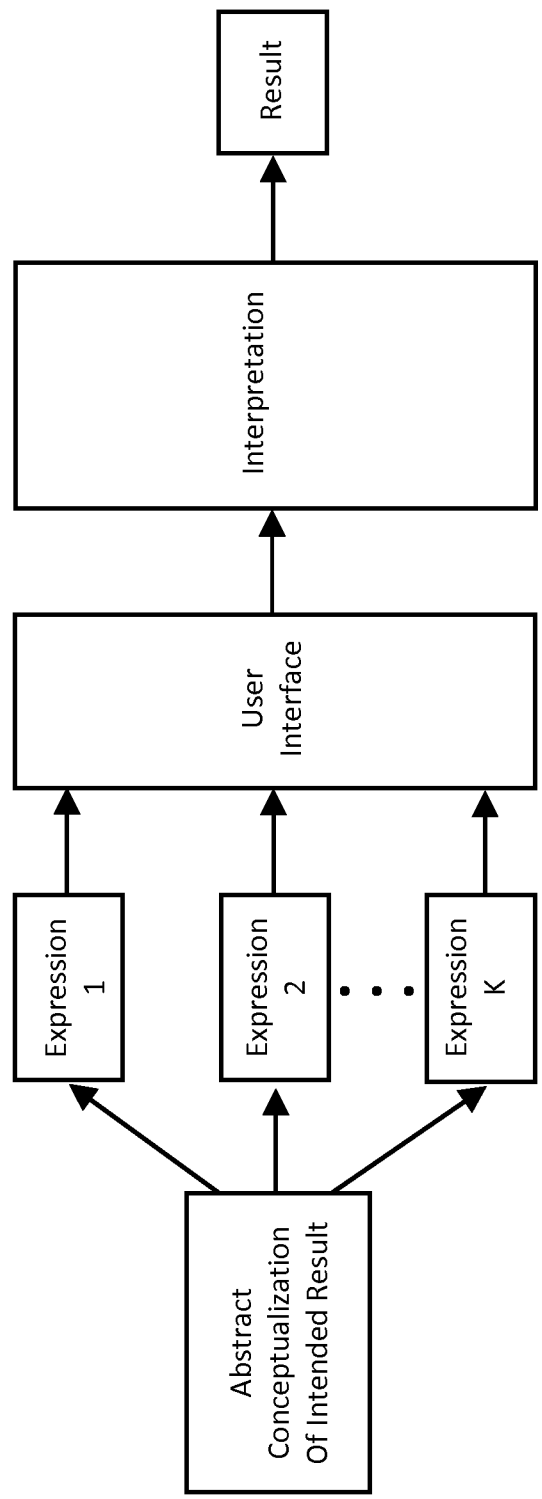
FIG. 35 depicts a representation of an example of two or more alternative gesture sequence expressions to convey the same meaning.

With such a rich structure, it is entirely possible for two or more alternative gesture sequence expressions to convey the same meaning This is suggested in FIG. 35.

The notion of tactile grammars is taught in U.S. Pat. No. 6,570,078, U.S. patent application Ser. Nos. 11/761,978 and 12/418,605, and U.S. Patent Provisional Application 61/449,923. Various broader and more detailed notions of touch gesture and other gesture linguistics in human user interfaces are taught in U.S. patent application Ser. No. 12/418,605 and U.S. Patent Provisional Application 61/449,923.

In most computer applications users are either giving commands or making inquiries (which can be viewed perhaps as a type of command). Examples include:

"Move—That—Here";
"Copy—That—Here";
"Delete—That";
"Do this—To—That"/"Change—That—This way";
"Create—That—Here";
"What is—That?"
"What is (are) the value(s)—of—That?"
"Where is—That?"
"What is (are)—Objects having that value/value-range/attribute?"

Although Direct Manipulation and WIMP GUIs perhaps reconstitute these somewhat in the mind of users as a sequence computer mouse operations guided by visual feedback, these commands or inquiries are in fact naturally represented as simple sentences. Is this the ultimate fate of the potential power and opportunities provide by touch interfaces?

So far today's widely adopted gesture-based multi-touch user interfaces have added these new time- and labor-saving features:

Swipe through this 1-dimensional list to this extent;
Swipe through this 2-dimensional list at this angle to this extent;
Stretch this image size to this explicit spatial extent;
Pinch this image to this explicit spatial extent;
Rotate this image by this explicit visual angle;

How much of the capability and opportunities provided by touch interfaces do these approaches utilize and deliver?

More specifically, as mentioned in the introductory material, the HDTP approach to touch-based user interfaces provides the basis for:

(1) a dense, intermixed quantity-rich/symbol-rich/metaphor-rich information flux capable of significant human-machine information-transfer rates; and (2) an unprecedented range of natural gestural metaphor support.

The latter (1) and its synergy with the former (2) is especially noteworthy, emphasized the quote [2]"Gestures are useful for computer interaction since they are the most primary and expressive form of human communication."

So how does technology and industry move forward with gesture-based interfaces to a practical, viable next step beyond today's widely adopted gesture-based multi-touch user interfaces?

Just broaden the number of built-in Direct Manipulation and WIMP GUI style manipulation operations than can skip a single menu step using gesture recognition?

Simply add 3D/6D capabilities to map applications, 3D graphics, games, data visualization, robot arms, etc. and more advanced menu and color selection functions if the touch interface provides roll, pitch, raw, and pressure along with X-Y location and velocity of touch contact?

Should the potential and power of touch-based interfaces, apparently on a scale far closer to spoken and written language than to that of a computer mouse, be used only for the awkwardly rendered semantic equivalent of short declarative sentences?

The HDTP approach to touch-based user interfaces in fact provides for something far closer to spoken and written language. To explore this, begin with the consideration of some very simple extensions to the sentence representation of traditional Direct Manipulation and WIMP GUI commands and inquiries listed above into slightly longer sentences. Some examples might include:

"Do—This—To Objects having—This value/value-range/attribute"

"Apply—This—To Objects previously having—This value/value-range/attribute"

"Find—General objects having that value/value-range/attribute—Then—Move to—Here"

"Find—Graphical objects having that value/value-range/attribute—Then—Move to—Here—and—Rotate—This amount"

"Find—Physical objects having that value/value-range/attribute—Then—Move to—Here (2D or 3D vector)—and—3D—rotate—This amount (vector of angles)"

"Find—Physical objects having that value/value-range/attribute—Then—Move to—Here—In this way (speed, route, angle)"

"Find—Objects having that value/value-range/attribute—Then—Create—One of these—For each—Of—Those"

Such very simple extensions are in general exceedingly difficult to support using Direct Manipulation and WIMP GUIs, and force users to very inefficiently break down the desired result into a time-consuming and wrist-fatiguing set of simpler actions that can be handled by Direct Manipulation, WIMP GUIs, and today's widely adopted gesture-based multi-touch user interfaces.

So yet again consider the quote [2]"Gestures are useful for computer interaction since they are the most primary and expressive form of human communication." What else is comparable? Speech and traditional writing of course are candidates. What is the raw material of there power once symbols (phonetic or orthographic) are formalized? Phrases, grammar, sentences, and higher-level context.

In hopes of leveraging this intrinsic communications machinery, perhaps even directly, attention is now directed to lexical categories, phrase categories, and context. This permits direct use and then, more importantly, extensions to aspects unique to touch interfaces and in particular the HDTP approach to them.

8.1 Lexical Categories

The invention provides for gestures to be semantically structured as parts of speech (formally termed "lexical categories") in spoken or written languages. Some example lexical categories relevant to command interface semantics include:

Noun;
Verb;
Adjective;
Adverb;
Infinitive;
Conjunction;
Particle.

The invention provides for gestures to be semantically structured according to and/or including one or more of these lexical categories, as well as others. Additionally, the invention provides for at least some gestures to be semantically structured according to alternative or abstract lexical categories that are not lexical categories of spoken or written languages.

8.2 Phrase Categories

The invention provides for such semantically structured gestures to be further structured according to phrase categories. Example phrase categories in spoken or written languages include:

Noun Phrase—noun plus descriptors/modifiers etc that collectively serves as a noun;

Verb Phrase—verb plus descriptors/modifiers etc that collectively serves as a verb;

Additionally, the invention provides for at least some phrase categories that are not lexical categories of spoken or written languages.

8.3 List, Phrase, and Sentence/Query Delimiters

For speech, delimiting between consecutive list items, phrases, and sentences/queries are performed through prosody:

Temporal pause;
Changes in rhythm;
Changes in stress;
Changes in intonation.

For traditional writing, punctuation is used for delimiting between consecutive list items, phrases, and sentences/queries:

The HDTP approach to touch-based user interfaces provides for delimiting between individual temporal gestures via at least these mechanisms:

Time separation between two consecutive strings of tactile gestures;

Distance separation between two consecutive strings of individual tactile gestures;

Lexigraphically separation (an tactile gesture string is unambiguously recognized, and the recognition event invokes a delineating demarcation between the recognized tactile gesture string and the next tactile gesture string to follow);

Special ending or starting attribute to strings of tactile gestures;

Special delimiting or entry-action gesture(s)—for example lift-off, tap with another finger, etc.

9. Data Flow Connections Among Tactile Gestures

Figure 36:
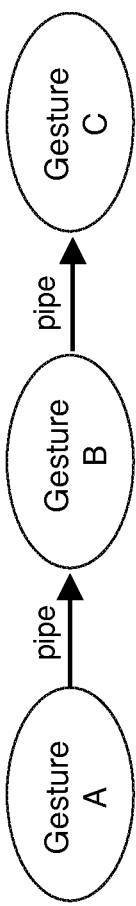
FIG. 36 depicts a representation of an example of a Unix™ Pipe standard-input/standard-output chain.

The invention provides for data flow connections among gestures. This can be accomplished in a number of ways by employing various types of analogies from computer and traditional languages, for example:

Unix™ Pipe standard-input/standard-output chains to define data flow connections between sequential pairs of tactile gestures (for example, as depicted in FIG. 36);
Traditional linguistic notions of context;
Intra-gestural Prosody As described earlier, other aspects of tactile gestures (for example "intra-gestural prosody") can be used as modifiers for the gestures. Again, examples of other aspects of tactile gestures include:

Rate of change of some aspect of a tactile gesture—for example velocity already in WIMP GUI (cursor location) and today's widely accepted multi-touch user interfaces (for example, finger flick velocity affects on scrolling);
Interrupted tactile gesture where action is taken by the user between the rendering of the gestemes comprising the tactile gesture. To adopt a formal linguistics term, this sort of action could be called a "gestural endoclitic," tactile endoclitic" or "tactile gesture endoclitic;"
Contact angles (yaw, roll, pitch);
Downward pressure;
Additional parameters from multiple finger gestures;
Shape parameters (finger-tip, finger-joint, flat-finger, thumb, etc.).

Recall the example provided earlier of the use of intra-gestural prosody to render an association through use a shared but distinguishing intra-gestural prosody—for example a finger angle, or number of fingers—in the rending of two or more tactile gestures that are to be associated. This also provides a basis for intra-gestural prosody to be used as to provide data flow connections among tactile gestures.

Also recall the example of the use of intra-gestural prosody to render an association is to use a finger angle, part of the finger (tip, joint, flat) or number of fingers as a signifier for a particular list item (first items, second item, etc), a particular visual object or range of screen (to the left of the gesture rendering area or cursor, to the right, above, below, 45-degree below, nearby, midrange, far, etc.), a particular element from an option list (cut, paste, copy, rotate, etc.), other such approach. This also provides a basis for intra-gestural prosody to be used as to provide data flow connections among tactile gestures and/or objects selected by or associated with one or more tactile gestures.

Figure 37:
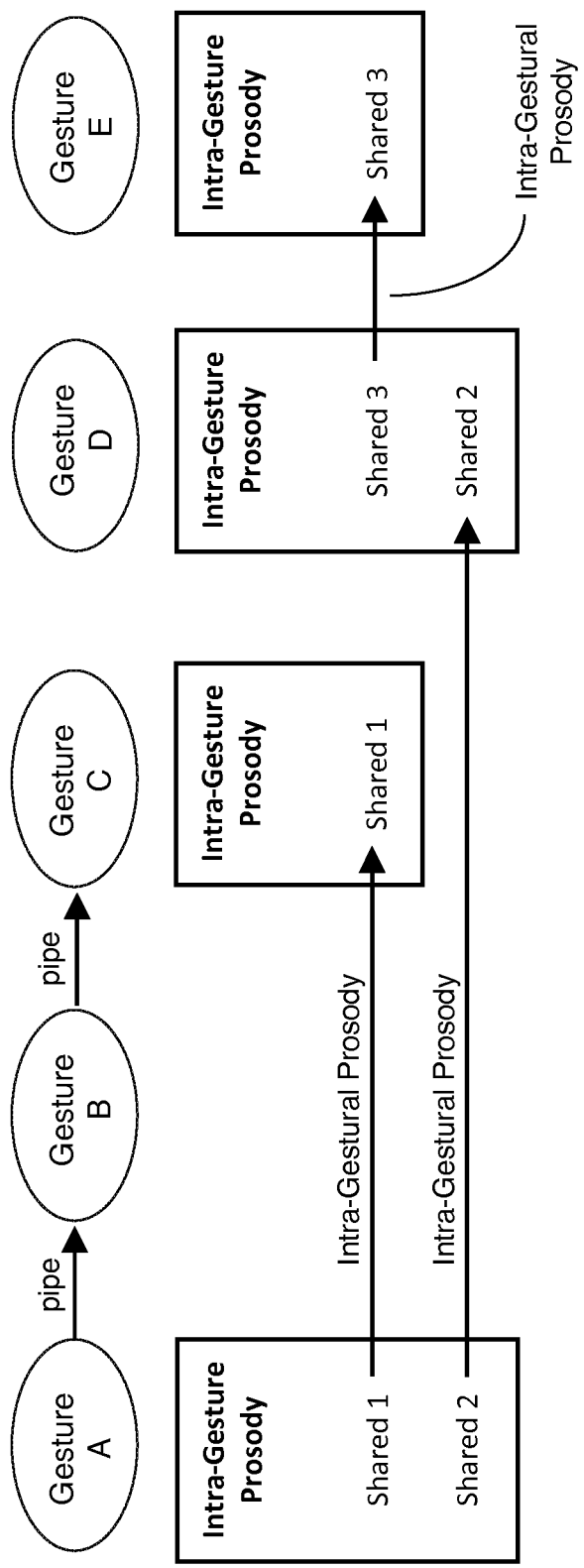
FIG. 37 depicts a representation of an example using intra-gesture prosody as a means of implementing both pipes and other associations and/or data flo connections.

FIG. 37 depicts a representation of an example using intra-gesture prosody as a means of implementing both pipes and other associations and/or data flow connections.

10. Mapping Tactile Gestures and Actions on Visual-Rendered Objects into Grammars The notion of tactile grammars is taught in U.S. Pat. No. 6,570,078, U.S. patent application Ser. Nos. 11/761,978 and 12/418,605, and U.S. Patent Provisional Application 61/449,923.

Various broader and more detailed notions of touch gesture and other gesture linguistics in human user interfaces are taught in U.S. patent application Ser. No. 12/418,605 and U.S. Patent Provisional Application 61/449,923.

10.1 Parsing Involving Objects that have been Associated with Gestures

Via touchscreen-locating, cursor-location or visually highlighting, a tactile gesture can be associated with a visual object rendered on a visual display (or what it is a signifier for, i.e., object, action, etc.). This allows for various types of intuitive primitive grammatical constructions. Some examples employing a tactile gesture in forming a subject-verb sentence or inquiry are:

The underlying (touchscreen), pointed-to (cursor), or selected (visually highlighted) visual object can serve as a subject noun and the tactile gesture serve as an operation action verb;
The underlying (touchscreen), pointed-to (cursor), or selected (visually highlighted) visual object can serve as an operation action verb and the tactile gesture serve as a subject noun;

Some examples employing a spatially-localized tactile gesture in forming a subject-verb-object sentence or inquiry are:

If context is employed to have earlier in time by some means selected a subject noun, the underlying (touchscreen), pointed-to (cursor), or selected (visually highlighted) visual object can serve as an object noun and the spatially-localized tactile gesture serve as an operation action verb;
If context is employed to have earlier in time by some means selected a subject noun, the underlying (touchscreen), pointed-to (cursor), or selected (visually highlighted) visual object can serve as an operation action verb and the spatially-localized tactile gesture serve as a object noun;
If context is employed to have earlier in time by some means selected an object noun, the underlying (touchscreen), pointed-to (cursor), or selected (visually highlighted) visual object can serve as an subject noun and the spatially-localized tactile gesture serve as an operation action verb;
If context is employed to have earlier in time by some means selected an object noun, the underlying (touchscreen), pointed-to (cursor), or selected (visually highlighted) visual object can serve as an operation action verb, and the spatially-localized tactile gesture serve as a subject noun;
If context is employed to have earlier in time by some means selected an operation action verb, the underlying (touchscreen), pointed-to (cursor), or selected (visually highlighted) visual object can serve as an subject noun, and the spatially-localized tactile gesture serve as an object noun;
If context is employed to have earlier in time by some means selected an operation action verb, the underlying (touchscreen), pointed-to (cursor), or selected (visually highlighted) visual object can serve as an object noun, and the spatially-localized tactile gesture serve as a subject noun.

Some examples employing a spatially-extended tactile gesture that in some way simultaneously spans two visual objects rendered on a visual display in forming a subject-verb-object sentence or inquiry are:

One underlying (touchscreen), pointed-to (cursor), or selected (visually highlighted) visual object can serve as a subject noun, the other underlying (touchscreen), pointed-to (cursor), or selected (visually highlighted) visual object can serve as an object noun and the spatially-extended tactile gesture serve as an operation action verb;
One underlying (touchscreen), pointed-to (cursor), or selected (visually highlighted) visual object can serve as a subject noun, the other underlying (touchscreen), pointed-to (cursor), or selected (visually highlighted)

visual object can serve as an operation action verb, and the spatially-extended tactile gesture serve as an object noun.

These examples demonstrate how context, order, and spatial-extent of gestures can be used to map combinations tactile gestures and visual-rendered objects into grammars; it is thus possible in a similar manner to include more complex phrase and sentence/inquiry constructions, for example using gestures and visual-rendered objects, utilizing context, order, and spatial-extent of gestures in various ways, to include:

Adjectives;
Adverbs;
Infinitives,
Conjunctions and other Particles—for example, "and," "or," negations ("no," "not"), infinitive markers ("to"), identifier articles ("the"), conditionals ("unless," "otherwise"), ordering ("first", "second," "lastly");
Clauses.

Further, as described (at least twice) earlier, other aspects of tactile gestures (for example "intra-gestural prosody") can be used as modifiers for the gestures. Again, examples of other aspects of tactile gestures include:

Rate of change of some aspect of a tactile gesture—for example velocity already in WIMP GUI (cursor location) and today's widely accepted multi-touch user interfaces (finger flick affects on scrolling);
Interrupted tactile gesture where action is taken by the user between the rendering of the gestemes comprising the tactile gesture;
Contact angles (yaw, roll, pitch);
Downward pressure;
Additional parameters from multiple finger gestures;
Shape parameters (finger-tip, finger-joint, flat-finger, thumb, etc.).

Examples of how the modifiers could be used as an element in a tactile grammar include:

Adjective;
Adverb;
Identifier.

In such an arrangement, such forms intra-gestural prosody can be viewed as a bound morpheme.

10.2 Layered Gesture-Level Metaphors

Mappings between intra-gestural prosody and grammatically-structured modifiers provides opportunities for a type of "layered-metaphor" to be used with, incorporated into, or applied to a particular gesture. For example:

| Intended Operation | Lexical Category | Tactile Gesture |
|---|---|---|
| Desired action in the application | Verb | Metaphorical gesture |
| How action is performed | Adverb | Intra-gestural prosody dynamics |
| Attributes of the action or result | Adjective | Intra-gestural prosody angles. pressure, shapes |

Of particular note is that a gesture supplemented with intra-gestural prosody used in this way can function as a noun-phrase, verb-phase, or even more complex constructions.

Figure 38:
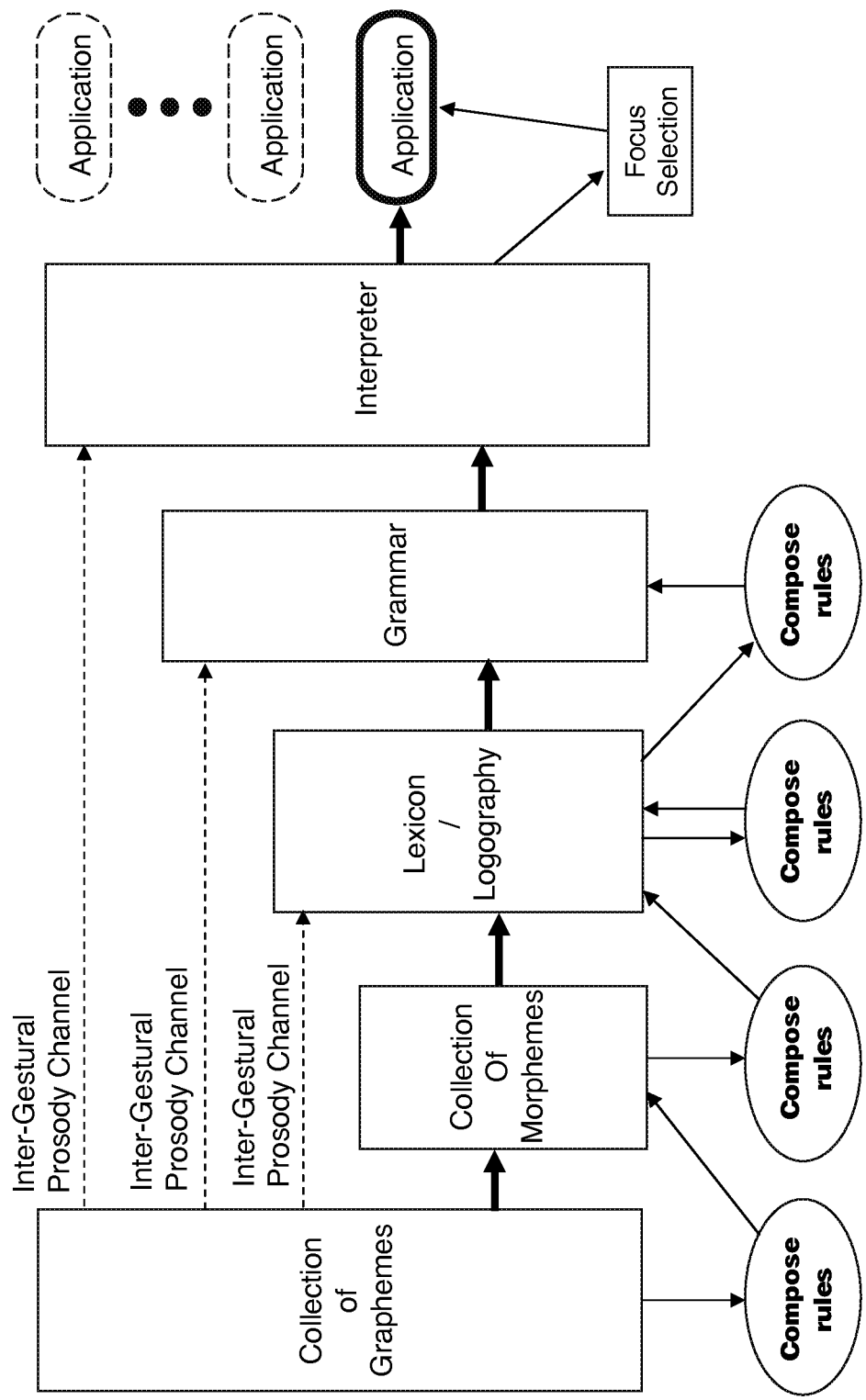
FIG. 38 depicts a composite view of some of the key the information flows supported by the construction provided thus far.

FIG. 38 depicts a composite view of some of the key information flows supported by the construction provided thus far.

11. Example: Simple Grammars for Rapid Operation of Physical Computer Aided Design (CAD) Systems by HDTP User Interfaces The following material is adapted from Adapted from U.S. Patent Application 61/482,248.

Attention is now directed to simple grammars for rapid operation of "physical-model" Computer Aided Design (CAD) systems, for example products such as Catia™, AutoCAD™, SolidWorks™, Alibre Design™, ViaCAD™, Shark™, and others including specialized 3D CAD systems for architecture, plant design, physics modeling, etc.

In such systems, a large number and wide range of operations are used to create even the small component elements of a more complex 3D object. For example:

3D objects of specific primitive shapes are selected and created in a specified 3D area,
Parameters of the shapes of these 3D objects are manipulated,
Color and/or texture is applied to the 3D objects
The 3D objects are positioned (x,y,z) and oriented (roll, pitch, yaw) in 3D space
The 3D objects are merged with other 3D objects to form composite 3D objects,
The composite 3D objects can be repositioned, reoriented, resized, reshaped, copied, replicated in specified locations, etc.

Many of these systems and most of the users who use them perform these operations from mouse or mouse-equivalent user interfaces, usually allowing only two parameters to be manipulated at a time and involving the selection and operation of a large number of palettes, menus, graphical sliders, graphical click buttons, etc. Spatial manipulations of 3D objects involving three spatial coordinates and three spatial angles, when adjusted two at a time, preclude full-range interactive manipulations experiences and can create immense combinatorial barriers to positioning and orienting 3D objects in important design phases. Palette and menu selection and manipulations can take many seconds at minimum, and it can often take a minimum of 20 seconds to 2 minutes for an experienced user to create and finalize the simplest primitive element.

The HDTP is particularly well suited for 3D CAD and drawing work because of both its 3D and 6D capabilities as well as its rich symbol and grammar capabilities.

Figure 39C:
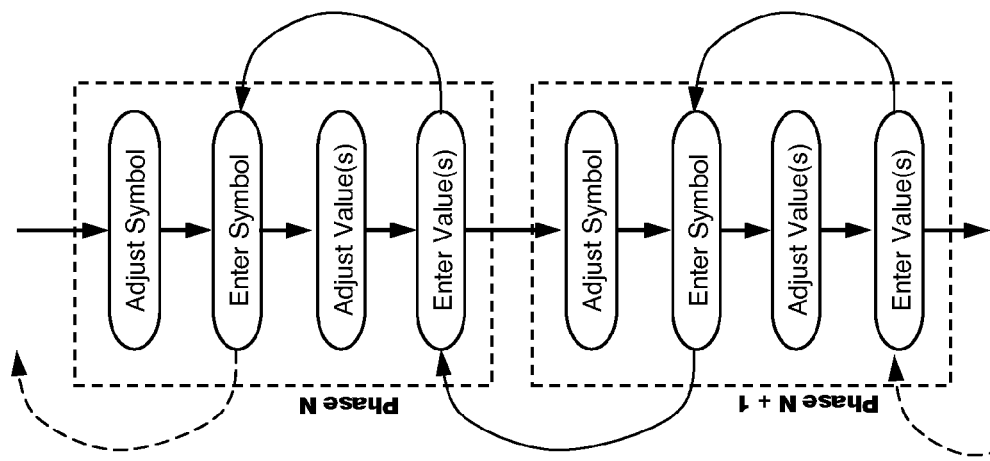
FIG. 39a though FIG. 39c depict representations of aspects of a very simple example grammar that can be used for rapid control of CAD or drawing software.
Figure 39B:
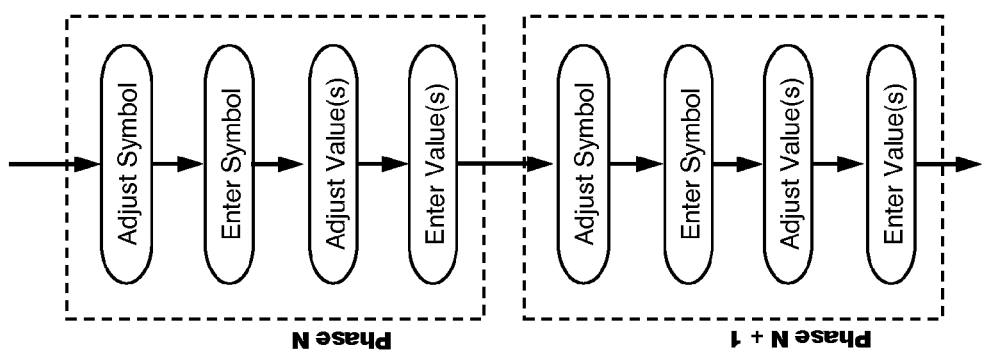
Figure 39A:
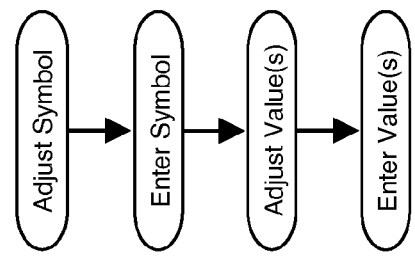

FIG. 39a depicts an example of a very simple grammar that can be used for rapid control of CAD or drawing software. Here a user first adjusts a finger, plurality of fingers, and/or other part(s) of a hand in contact with an HDTP to cause the adjustment of a generated symbol. In an example embodiment, the generated symbol can cause a visual response on a screen. In an embodiment, the visual response can comprise, for example, one or more of:

an action on a displayed object,
motion of a displayed object,
display of text and/or icons,
changes in text and/or icons,
migration of a highlighting or other effect in a menu, palette, or 3D arrays,
display, changes in, or substitutions of one or more menus, pallets, or 3D arrays,
other outcomes.

In an example embodiment, when the user has selected the desired condition, which is equivalent to selection of a particular symbol, the symbol is then entered. In an example embodiment, the lack of appreciable motion (i.e., "zero or slow" rate of change) can serve as an "enter" event for the symbol. In another example embodiment, an action (such as a finger tap) can be made by an additional finger, plurality of fingers, and/or other part(s) of a hand. These examples are merely meant to be illustrative and is no way limiting and many other variations and alternatives are also possible, anticipated, and provided for by the invention.

In an example embodiment, after the user has entered the desired selection ("enter symbol"), the user can then adjust one or more values by adjusting a finger, plurality of fingers, and/or other part(s) of a hand in contact with an HDTP. In an embodiment, the visual response can comprise, for example, one or more of:

an action on a displayed object,
motion of a displayed object,
display of text and/or icons,
changes in text and/or icons,
changes in the state of the object in the CAD or drawing system software,
other outcomes.

This example is merely meant to be illustrative and is no way limiting and many other variations and alternatives are also possible, anticipated, and provided for by the invention.

In an example embodiment, when the user has selected the desired value, the symbol is then entered. In an example embodiment, the lack of appreciable motion (i.e., "zero or slow" rate of change) can serve as an "enter" event for the value. In another example embodiment, an action (such as a finger tap) can be made by an additional finger, plurality of fingers, and/or other part(s) of a hand. These examples are merely meant to be illustrative and is no way limiting and many other variations and alternatives are also possible, anticipated, and provided for by the invention.

The aforedescribed example sequence and/or other variations can be repeated sequentially, as shown in FIG. 39*b*.

Additionally, at least one particular symbol can be used as an "undo" or "re-try" operation. An example of this effect is depicted in FIG. 39*c*.

Figure 40:
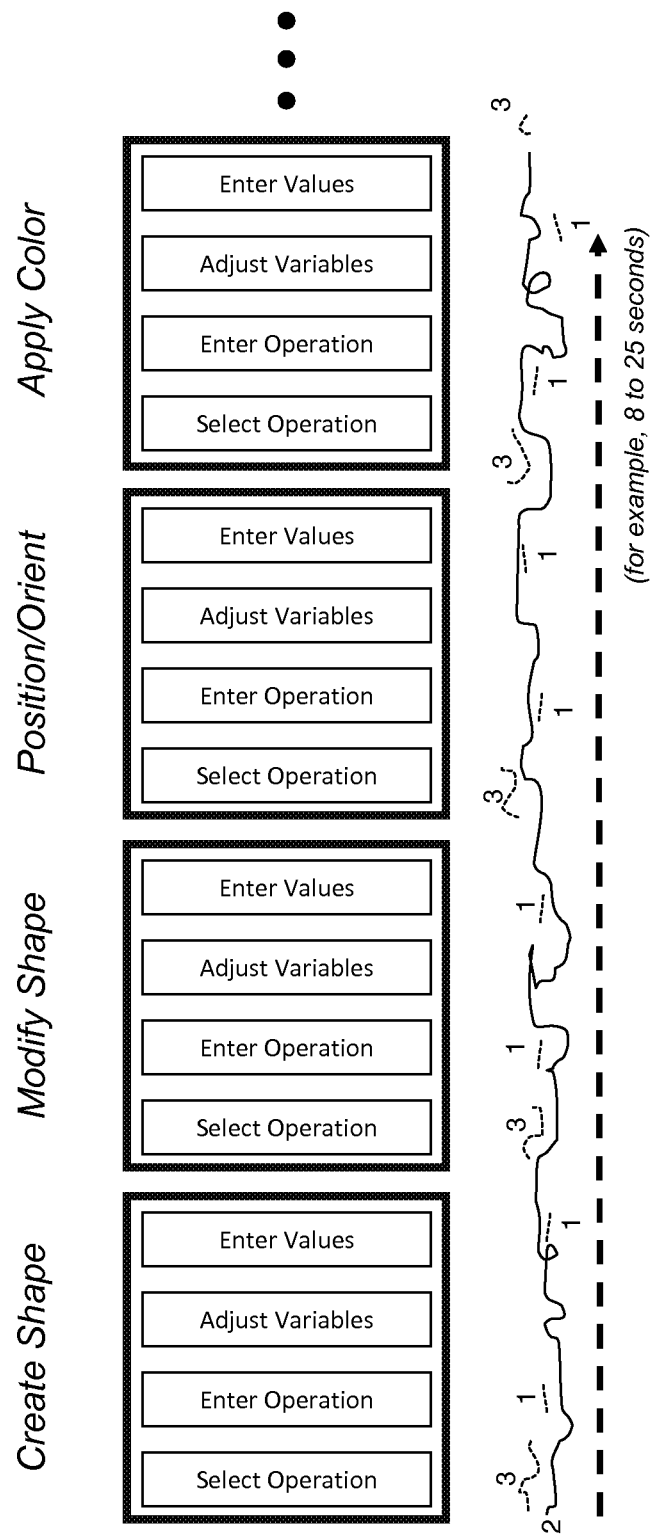
FIG. 40 depicts how the simple example grammar can be used to control a CAD or drawing program.

FIG. 40 depicts how the aforedescribed simple grammar can be used to control a CAD or drawing program. In this example, two and/or three fingers (left of the three fingers denoted "1", middle of the three fingers denoted "2", right of the three fingers denoted "3") could be employed, although many other variations are possible and this example is by no means limiting. In one approach, at least finger 2 is used to adjust operations and values, while finger 3 is used to enter the selected symbol or value. Alternatively, the lack of appreciable further motion of at least finger 2 can be used to enter the selected symbol or value. In FIG. 40, both finger 2 and finger 1 are used to adjust operations and values. Alternatively, the roles of the fingers in the aforedescribed examples can be exchanges. Alternatively, additional fingers or other parts of the hand (or two hands) can be used add additions or substitutions. These examples are merely meant to be illustrative and is no way limiting and many other variations and alternatives are also possible, anticipated, and provided for by the invention.

As an example of ease of use, the aforedescribed grammar can be used to create a shape, modify the shape, position and/or (angularly) orient the shape, and apply a color (as depicted in FIG. 40), all for example in as little as a few seconds. In example embodiments of this type, the touch is mostly light and finger motions easy and gentle to execute.

As described earlier, the HDTP and the present invention can support a wide range of grammars, including very sophisticated ones. Far more sophisticated grammars can therefore be applied to at least Computer Aided Design (CAD) or drawing software and systems, as well as other software and systems that can benefit from such capabilities.

In an embodiment, an HDTP provides real-time control information to Computer Aided Design (CAD) or drawing software and systems. In an embodiment, an HDTP provides real-time control information to Computer Aided Design (CAD) or drawing software and systems through a USB interface via HID protocol. In an embodiment, an HDTP provides real-time control information to Computer Aided Design (CAD) or drawing software and systems through a HID USB interface abstraction.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

REFERENCES

[1] Shneiderman "Direct Manipulation. A Step Beyond Programming Languages" *IEEE Transactions on Computers* 16 (8), 1983, pp. 57-69.

[2] J. Wachs, M. Kolsch, H. Stern, Y. Edan, "Vision-Based Hand-Gesture Applications," *Communications of the ACM*, Vol. 54 No. 3, February 2011, pp. 60-71.

[3] M. Eden, "On the Formalization of Handwriting," in Structure of Language and its Mathematical Aspects, American Mathematical Society, 1961.

The invention claimed is:

1. A method for a multi-touch gesture- based user interface, the method comprising:

concatenating a first subset of gestemes from a plurality of gestemes based on at least temporal logic and at least one parameter associated with a space function for constructing a first gesture, each gesteme being primitive gesture segments;

concatenating a second subset of gestemes from the plurality of gestemes based on at least function for temporal logic and at least one parameter associated with the space function for constructing a second gesture;

receiving real-time multi-touch gesture-based information from a multi-touch gesture-based user interface;

processing the real-time multi-touch gesture-based information to sequentially identify over intervals of real-time at least a recognized sequence of specific gestemes belonging to the plurality of gestemes;

determining from the sequence of gestemes that the user's execution of at least one gesture has been completed;

determining from the sequence of gestemes a specific gesture represented by the sequence of gestemes;

wherein the gesture is recognized as either the first gesture or the second gesture according to the sequence of gestemes.

2. The method of claim 1 wherein gesture grammars are provided using the sequence of gestemes.

3. The method of claim 1 wherein structured-meaning gesture- lexicon frameworks are provided using the sequence of gestemes.

4. The method of claim 1 wherein gesture context frameworks are provided using the sequence of gestemes.

5. The method of claim 1 wherein the use of gesture prosody is provided.

6. A method for controlling an application operating on a processor with a multi-touch gesture-based user interface, the method comprising:

receiving a gesture in real time from a high-definition touch pad (HDTP); deconstructing the gesture into a sequence of gestemes as the gesture is received, each gesteme comprising distinct primitive gesture segments;

determining from the sequence of gestemes that the gesture has been completed;

recognizing the sequence of gesteme as a particular command to the application; and transmitting the particular command to the application operating on the processor.

7. The method of claim 6 wherein gesture grammars are provided using the sequence of gestemes.

8. The method of claim 6 wherein structured-meaning gesture-lexicon frameworks are provided using the sequence of gestemes.

9. The method of claim 6 wherein gesture context frameworks are provided using the sequence of gestemes.

10. The method of claim 6 wherein the use of gesture prosody is provided.

* * * * *